United States Patent [19]

Harris et al.

[11] Patent Number: 5,408,055

[45] Date of Patent: Apr. 18, 1995

[54] CORDLESS TRANSDUCER PHASE REFERENCE AND DATA COMMUNICATION APPARATUS AND METHOD FOR DIGITIZERS

[75] Inventors: Andrew M. Harris; James Watson, both of Phoenix, Ariz.

[73] Assignee: CalComp Inc., Anaheim, Calif.

[21] Appl. No.: 140,841

[22] Filed: Oct. 25, 1993

[51] Int. Cl.6 .............................................. G08C 21/00
[52] U.S. Cl ....................................... 178/19; 345/179
[58] Field of Search ...................... 178/18, 19; 345/179

[56] References Cited

U.S. PATENT DOCUMENTS

| Re. 34,187 | 3/1993 | Yamanami | 178/19 |
|---|---|---|---|
| 4,654,648 | 3/1987 | Herrington | 340/710 |
| 4,754,268 | 6/1988 | Mori | 340/710 |
| 4,777,329 | 10/1988 | Mallicoat | 178/18 |
| 4,795,858 | 1/1989 | Yamazak | 178/19 |
| 4,796,019 | 1/1989 | Averbach | 340/709 |
| 5,073,685 | 12/1991 | Kobayashi | 178/18 |
| 5,124,509 | 6/1992 | Hoendervoogt et al. | 178/19 |
| 5,134,689 | 7/1992 | Murakami | 395/143 |
| 5,138,118 | 8/1992 | Russell | 178/19 |
| 5,160,813 | 11/1992 | Watson | 178/19 |
| 5,235,142 | 8/1993 | Landmeier et al. | 178/19 |

Primary Examiner—Stephen Chin
Assistant Examiner—Kevin Kim
Attorney, Agent, or Firm—Wm. F. Porter, Jr.; Donald Streck

[57] ABSTRACT

A device for indicating the phase of the a full-frequency alternating current (AC) magnetic field signal transmitting from the pointing device of a cordless digitizer and for determining if the phase of a half-frequency alternating current (AC) magnetic field signal transmitting from the pointing device is approximately the same or approximately inverted from an immediately preceding half-frequency signal from the pointing device. The indication of the phase of the full-frequency pointing device signal is used by the digitizer logic circuits to determine the location of the pointing device on the tablet's sensing surface. The information concerning the change in phase of the half-frequency signal is used by the digitizer logic circuits to decode the status of various pointing device buttons. If the phase in the induced half-frequency signal is unchanged from the last, this no-change condition represents one binary state. If the phase has changed, the condition represents the other binary state. Accordingly, a binary encoded message may be transferred from the pointing device to the digitizer tablet for decoding via this phase change method.

20 Claims, 14 Drawing Sheets

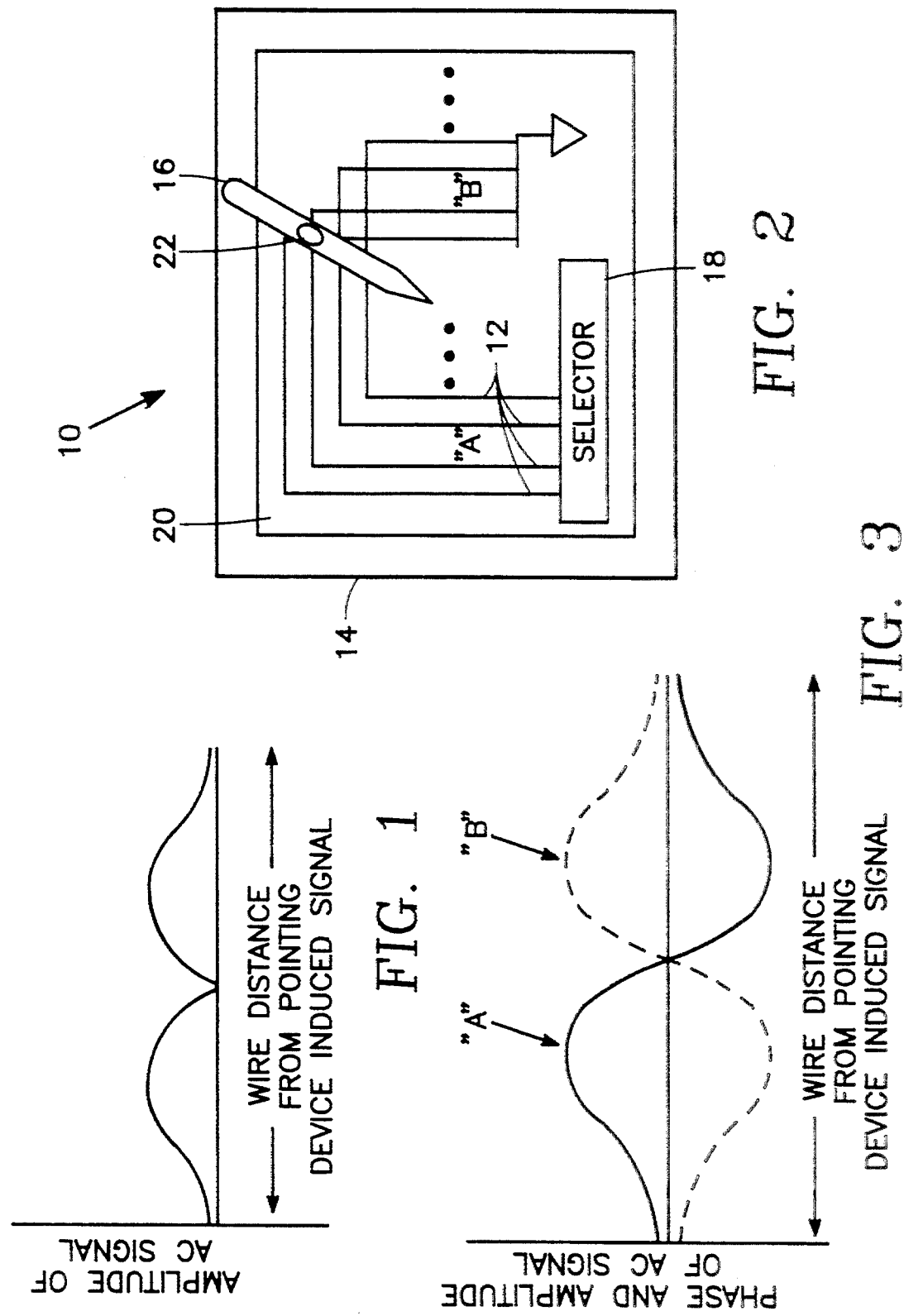

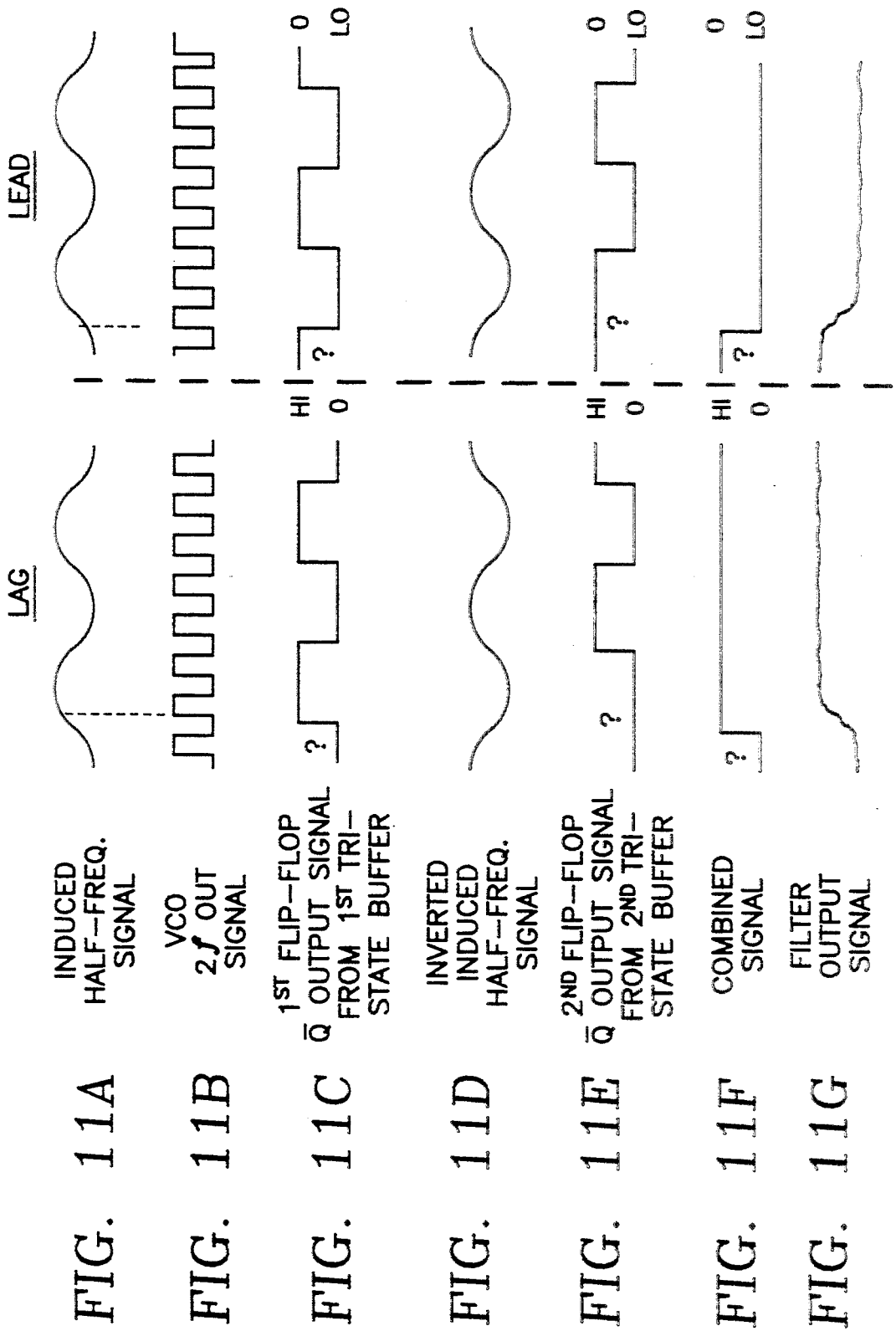

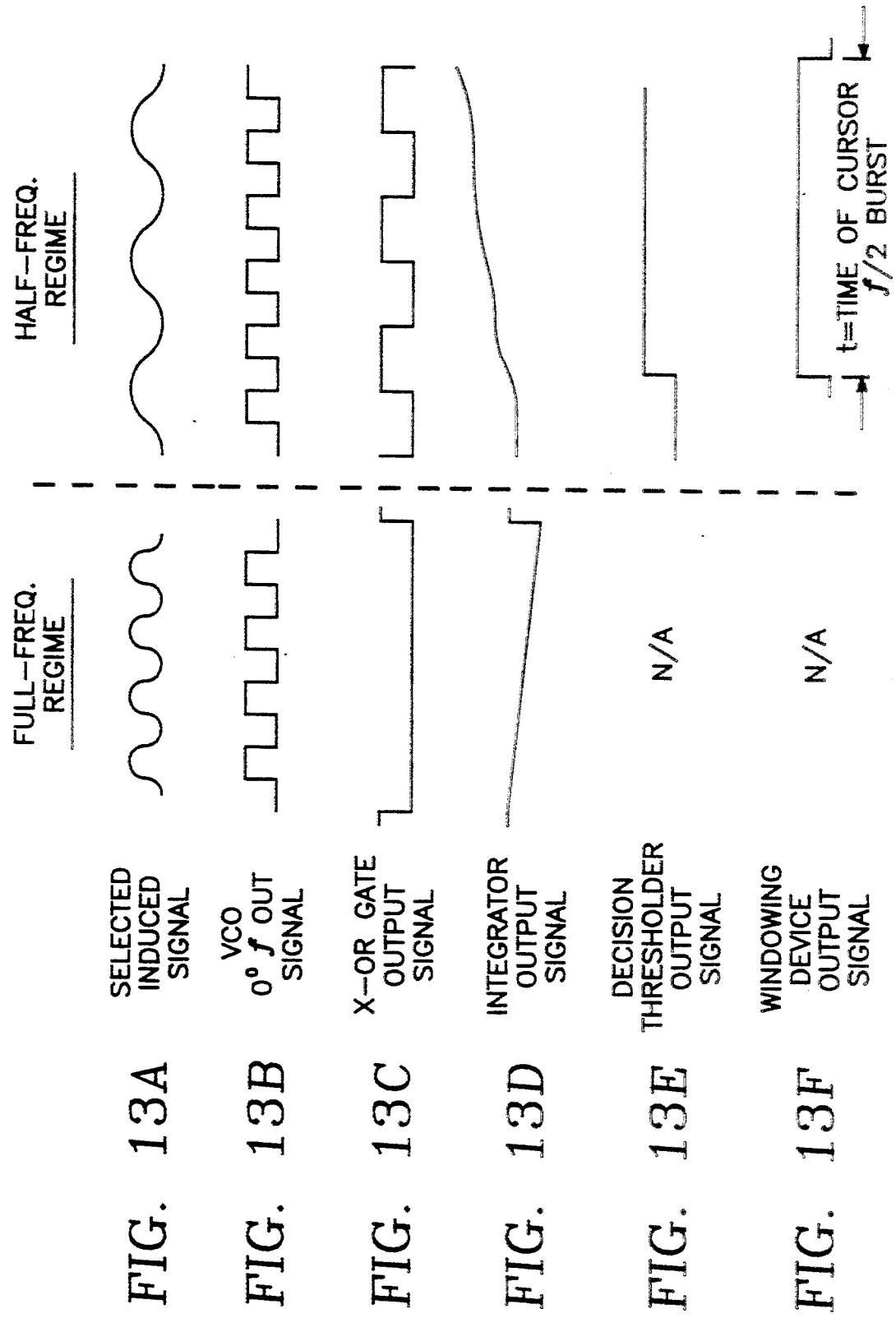

INDUCED
HALF-FREQ.
SIGNAL

HALF-FREQ.
PRESENT
SIGNAL

1ST AND GATE
OUTPUT
SIGNAL

VCO
90° $f$ OUT
SIGNAL
(INVERTED)

1ST FLIP-FLOP
Q OUTPUT
SIGNAL
(180° OUT
OF PHASE)

VCO
90° $f$ OUT
SIGNAL
(IN-PHASE)

1ST FLIP-FLOP
Q OUTPUT
SINAL
(IN-PHASE)

VCO
0° f OUT
SIGNAL

POINTING DEVICE
PHASE STATE
SIGNAL (OUT)

(IN)

1ST X-OR
GATE
OUTPUT
SIGNAL

÷2 COUNTER
OUTPUT
SIGNAL

INDUCED
HALF-FREQ.
SIGNAL (IN)

(OUT)

2ND X-OR
GATE
OUTPUT
SIGNAL (IN)

(OUT)

INTEGRATOR
OUTPUT
SIGNAL (IN)

(OUT)

DECISION
THRESHOLDER
OUTPUT
SIGNAL (IN)

(OUT)

FIG. 18A ÷2 COUNTER OUTPUT SIGNAL
FIG. 18B INDUCED FULL-FREQ. SIGNAL
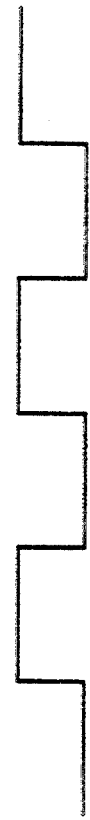
FIG. 18C 2ND X-OR GATE OUTPUT SIGNAL
FIG. 18D INTEGRATOR OUTPUT SIGNAL
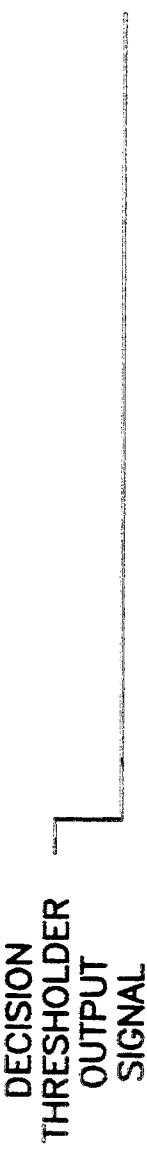
FIG. 18E DECISION THRESHOLDER OUTPUT SIGNAL

# CORDLESS TRANSDUCER PHASE REFERENCE AND DATA COMMUNICATION APPARATUS AND METHOD FOR DIGITIZERS

BACKGROUND OF THE INVENTION

1. Technical Field

This invention relates to cordless digitizers and, more particularly, to a device for indicating the phase of a signal transmitting from the pointing device and pointing device button status.

2. Background Art

Digitizer systems for use as input devices to computers are well known in the art. In a typical digitizer system, a pointing device is moved over the sensing (or working) surface of a tablet wherein the sensing surface of the tablet defines the boundaries of an X-Y coordinate system. Sometimes, the position of the pointing device on the sensing surface of the tablet is determined by electrostatic means. For many reasons, an electromagnetic sensing link between the pointing device and the tablet provides superior results and is preferred.

Recently, so-called "cordless digitizers" in which there is no connecting cable between the pointing device and the tablet have become popular. In an electromagnetic version as manufactured by the assignee of this application, a digitizer tablet employs grid conductors for each of the two coordinate directions. A pointing device is the "driven" member and emits an alternating current (AC) magnetic field from its tip at a given frequency. The magnetic field emanations induce signals into the grid wires which are then used by the tablet electronics to determine the location of the pointing device. In practice, first the grid conductors for one coordinate direction are individually selected by a selector device and the induced signal therein is sensed. Then the grid conductors for the other coordinate direction are similarly selected and sensed. The amplitude characteristics of the induced signal and its magnitude are used by the tablet electronics and logic to determine how close the pointing device is to the grid conductor being sensed. When all the grid conductors have been sampled, the location of the pointing device on the tablet's sensing surface is derived.

In an implementation, where any given grid conductor crosses the sensing surface area only once, an amplitude characteristic associated with the signal induced in the grid conductor by the pointing device positioned in the middle of a group of conductors is depicted in FIG. 1. It should be noted that the pointing device location is indicated by the null in the plot of the amplitude characteristic.

In a case where a large sensing area is needed, it is often desired that the number of grid conductors be kept at a minimum to simplify construction of the tablet and reduce the manufacturing costs. This is accomplished by having an individual conductor cross the sensing surface more than once. FIG. 2 shows an implementation of a digitizer 10 where each conductor 12 crosses the sensing surface 20 of the tablet 14 twice. This configuration results in one leg of a conductor 12 being in one half of the tablet 14 and the other leg being in the other half of the tablet 14. However, an ambiguity as to the position of the pointing device 16 arises in such a configuration. The ambiguity results because a pointing device 16 placed near one side of a first leg of a conductor 12, will induce a signal in the conductor 12 as viewed from the selector 18 having the same voltage magnitude as the signal induced if the pointing device 16 had been placed the same distance from the other leg of the conductor 12. For example, a pointing device 16 placed at location "A" in FIG. 2 would induce a signal having an identical voltage magnitude as that induced had the pointing device been placed at location "B". Therefore, the aforementioned ambiguity as to the position of the pointing device 16 must be resolved in a digitizing system employing conductors 12 which cross the working surface of the tablet 14 more than once.

The ambiguity can be resolved if the phase of the signal induced in the conductors 12 is known relative to the pointing device signal. FIG. 3 depicts the amplitude/phase characteristics that would result from a pointing device 16 placed at positions "A" and "B" of FIG. 2. As can be seen the phase of the signal induced at location "A" is opposite of the signal induced at location "B". The pointing device signal will be in phase with the induced signal at one of the locations and 180 degrees out of phase at the other location. Which location corresponds to which phase is simply a matter of convention and can be made to be either way. Accordingly, by knowing the phase of the pointing device signal, the actual location of the pointing device 16 can be differentiated from the anomalous location.

In past implementations, a wired connection between the pointing device and the tablet was used to determine the phase of the field transmitting from the pointing device. However, in a cordless pointing device system, alternate means must be employed to acquire this phase information.

According to some prior art techniques, additional pick-up conductor loops are incorporated in addition to the necessary position sensing conductors. However, these extra loops require additional conductors on the sensing grid. These extra conductors increase undesirable grid capacitance and make manufacturing the grid more difficult and costly. This technique also requires that the grid employed in a cordless pointing device system to be different from that in a corded system. Therefore, a system capable of determining the phase of the pointing device signal in a cordless digitizer without the addition of extra conductors is needed.

To allow the user of the digitizer to indicate when positional information, and the like, is being transmitted from the pointing device to the tablet, the pointing device usually has one or more manually-operated buttons associated with it. Typically, when the user wishes to transmit data, one of the buttons is depressed. The pointing device then transmits an encoded signal to the digitizer tablet. The tablet electronics senses the encoded signal and performs whatever function is associated with that code.

Many different encoding schemes have been employed to transmit the aforementioned code in a cordless digitizer. Among these are Frequency Shift Keying (FSK), Phase Shift Keying (PSK), and Amplitude Modulation (AM), and variations thereof. These encoding schemes generally modify the basic pointing device signal in some way so as to create a binary code decodable by the digitizer electronics. In the past, the encoding/decoding and the phase determination schemes have been independent processes. If these two functions are combined, the resulting cordless digitizer could be simplified considerably, thereby realizing the associated manufacturing cost savings.

Wherefore, it is an object of the present invention to combine the phase determining and signal decoding functions such that each is accomplished using the same signal transmission from the pointing device.

Other objects and benefits of the invention will become apparent from the detailed description which follows hereinafter when taken in conjunction with the drawing figures which accompany it.

SUMMARY OF THE INVENTION

The foregoing objects have been attained by a device for use in a cordless digitizer having a pointing device capable of separately transmitting first and second alternating current (AC) magnetic field signals, where the second pointing device signal frequency is some fraction, such as one-half, of the frequency of the first pointing device signal. In addition, the second pointing device signal has one of a first and second phase state differing by 180 degrees. This variation in phase is used to encode the signal with a binary code signaling the activation of a button resident on the pointing device. Each transmission of the second pointing device signal sequentially corresponds to a binary bit of the activated button's code wherein the first phase state corresponds to a first binary state of the code and the second phase state corresponds to a second binary state of the code.

The device includes a pointing device signal phase indicating circuit for indicating the phase of the first pointing device signal. As discussed previously, the indication of the phase of the pointing device signal is used by the digitizer logic circuits to determine the location of the pointing device on the tablet's sensing surface. The pointing device signal phase indicating circuit uses a full-frequency signal and a half-frequency signal induced in a sensing conductor in the digitizer's tablet to create a signal indicating the phase of the first pointing device signal. The induced full-frequency signal is induced by the pointing device first signal and the induced half-frequency signal is induced by the pointing device second signal. It is noted that an alternate device for indicating the phase of a pointing device signal using an induced lower frequency signal are disclosed in U.S. application Ser. No. 08/140,855, filed Oct. 25, 1983, by James S. Watson entitled "HALF NORMAL FREQUENCY REGIME PHASE ENCODING IN CORDLESS DIGITIZERS", which is assigned to the assignee of the present application.

The device also has a half-frequency phase state indicating circuit for determining if the phase of the half-frequency signal induced in the sensing conductor by the pointing device is approximately the same or approximately inverted in comparison to an immediately preceding induced half-frequency signal. This information is used by the digitizer to decode the status of various pointing device buttons. If the phase in the induced half-frequency signal is unchanged from the last, this no-change condition represents one binary state. If the phase has changed, the condition represents the other binary state. Accordingly, a binary encoded message may be transferred from the pointing device to the tablet for decoding by the digitizer logic circuits via this phase change method.

The pointing device phase indicating circuit includes a reference signal generating sub-circuit for providing reference signals having about the same frequency as the induced full-frequency signal where a first reference signal is approximately in phase with the induced full-frequency signal and a second reference signal is about 90 degrees out of phase with the induced full-frequency signal. These reference signals are generated from the induced full-frequency signal whenever the pointing device is transmitting the pointing device first signal and the induced half-frequency signal whenever the pointing device is transmitting the pointing device second signal. Specifically, the reference signal generating sub-circuit includes a first phase-lock loop (PLL) for providing the first and second reference signals whenever the induced full-frequency signal is present at the input thereto. The first reference signal is in phase with the induced full-frequency signal and the second reference signal leads the first signal by 90 degrees. This first PLL also includes a circuit for enabling the first PLL only when the induced full-frequency signal is present at the input. In addition, the reference signal generating sub-circuit includes a second PLL for providing the full-frequency first and second reference signals whenever the induced half-frequency signal is present at the input. This second PLL includes a circuit for enabling the second PLL only when the induced half-frequency signal is present at the input. These reference signals are furnished to the other sub-circuits of the pointing device signal phase indicating circuit as described below.

The pointing device signal phase indicating circuit also includes a half-frequency signal present indicating sub-circuit for providing a half-frequency present signal indicating whether the pointing device is transmitting the second pointing device signal. This half-frequency present signal is formed from the signal induced by the pointing device in the conductor and the first reference signal. The output signal from this sub-circuit is used by the other sub-circuits of the pointing device signal phase indicating circuit to determine whether the pointing device is transmitting the second pointing device signal.

Finally, the pointing device signal phase indicating circuit includes a pointing device signal phase state sub-circuit. This sub-circuit provides a pointing device phase state signal indicating whether the induced full-frequency signal is closer to being in phase with or 180 degrees out of phase with the pointing device first signal. The pointing device phase state signal is formed from the induced half-frequency signal and the second reference signal.

The half-frequency phase state indicating circuit uses the pointing device signal phase indicating circuit and includes some additional circuitry to create a half-frequency phase state signal indicating whether the induced second signal has a phase substantially the same as or a phase about 180 degrees different from an immediately preceding induced half-frequency signal. First, a half-frequency reference signal is generated by comparing the first reference signal and the pointing device phase state signal. The half-frequency reference signal is then compared to the induced half-frequency signal to form the aforementioned half-frequency phase state signal.

Accordingly, an object of the present invention is fulfilled as the phase determining and signal decoding functions are combined such that each is accomplished using the same signal transmission from the pointing device.

DESCRIPTION OF THE DRAWINGS

These and other features, aspects, and advantages of the present invention will become better understood with regard to the following description, appended claims, and accompanying drawings where:

FIG. 1 is a simplified graph of the amplitude characteristic of a signal induced in a conductor in a digitizer tablet wherein the conductors cross the sensing surface only once.

FIG. 2 is a simplified diagram of a digitizer tablet wherein the conductors cross the sensing surface twice.

FIG. 3 is a simplified graph of the amplitude characteristic of a signal induced in a conductor in the digitizer tablet of FIG. 2.

FIGS. 10a–d are graphs of the contemporaneous waveforms of an induced full-frequency signal, VCO 90° f out signal, X-OR gate output signal, and filter output signal, respectively, associated with the first phase-lock loop in the circuit of FIG. 9.

FIGS. 11a–g are graphs of the contemporaneous waveforms of an induced half-frequency signal, VCO 2f out signal, first flip-flop inverse "Q" output signal, inverted induced half frequency signal, second flip-flop inverse "Q" output signal, combined signal, and filter output signal, respectively, associated with the second phase-lock loop in the circuit of FIG. 9.

FIGS. 13a–f are graphs of the contemporaneous waveforms of a selected induced signal, VCO 0° f out signal, X-OR gate output signal, integrator output signal, decision thresholder output signal, and windowing device output signal, respectively, associated with the circuit of FIG. 12.

FIGS. 18a–e are graphs of the contemporaneous waveforms of a divide-by-two counter output signal, induced full-frequency signal, second X-OR gate output signal, integrator output signal, and decision thresholder output signal, respectively, associated with the full-frequency regime of the circuit of FIG. 16.

DETAILED DESCRIPTION OF THE INVENTION

Figure 4:
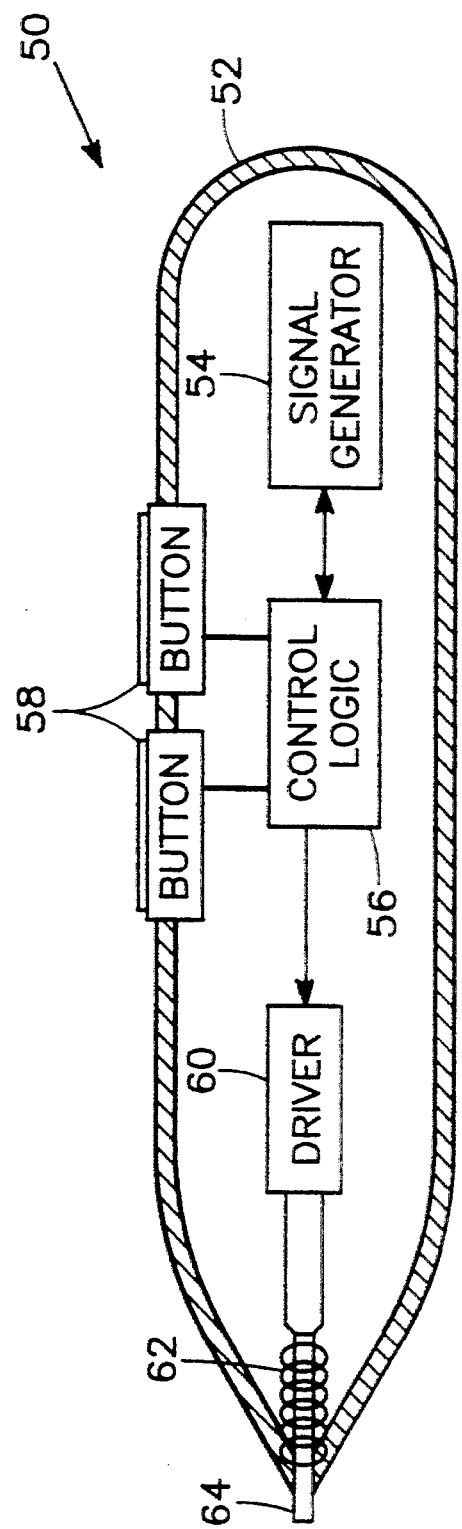
FIG. 4 is a simplified diagram of the pointing device associated with the present invention.

Referring to FIG. 2, the present invention resides in a cordless digitizer 10 employing a pointing device 16 which emanates an alternating current (AC) magnetic field signal to impart positional and pointing device button status information. The pointing device signal induces a signal in the conductors 12 of the digitizer tablet 14. This signal is used by the tablet electronics (not shown) to determine the position of the pointing device 16 on the sensing surface 20 of the tablet. In addition, the encoded portion of the signal induced in the conductors 12 by the pointing device 16 is decoded by the tablet electronics to determine the status of pointing device buttons 22. However, several significant modifications are made to the digitizer of FIG. 2 to implement the present invention.

The pointing device 50 in this system is shown in FIG. 4. Inside the housing 52 is disposed a basic pointing device signal generator 54 for generating a basic pointing device signal having a predetermined frequency and outputting the basic pointing device signal for a predetermined period of time whenever the generator 54 is activated. The basic pointing device signal generator 54 is connected to the control logic 56 of the pointing device 50. The control logic 56 has inputs from one or more buttons 58 disposed on the housing 52. Two buttons 58 are shown in FIG. 4. The control logic 56 outputs to the driver 60. The driver 60 is employed to energize the coil apparatus 62, thereby causing the aforementioned AC magnetic field signal to be transmitted from the pointing device tip 64.

Figure 5:
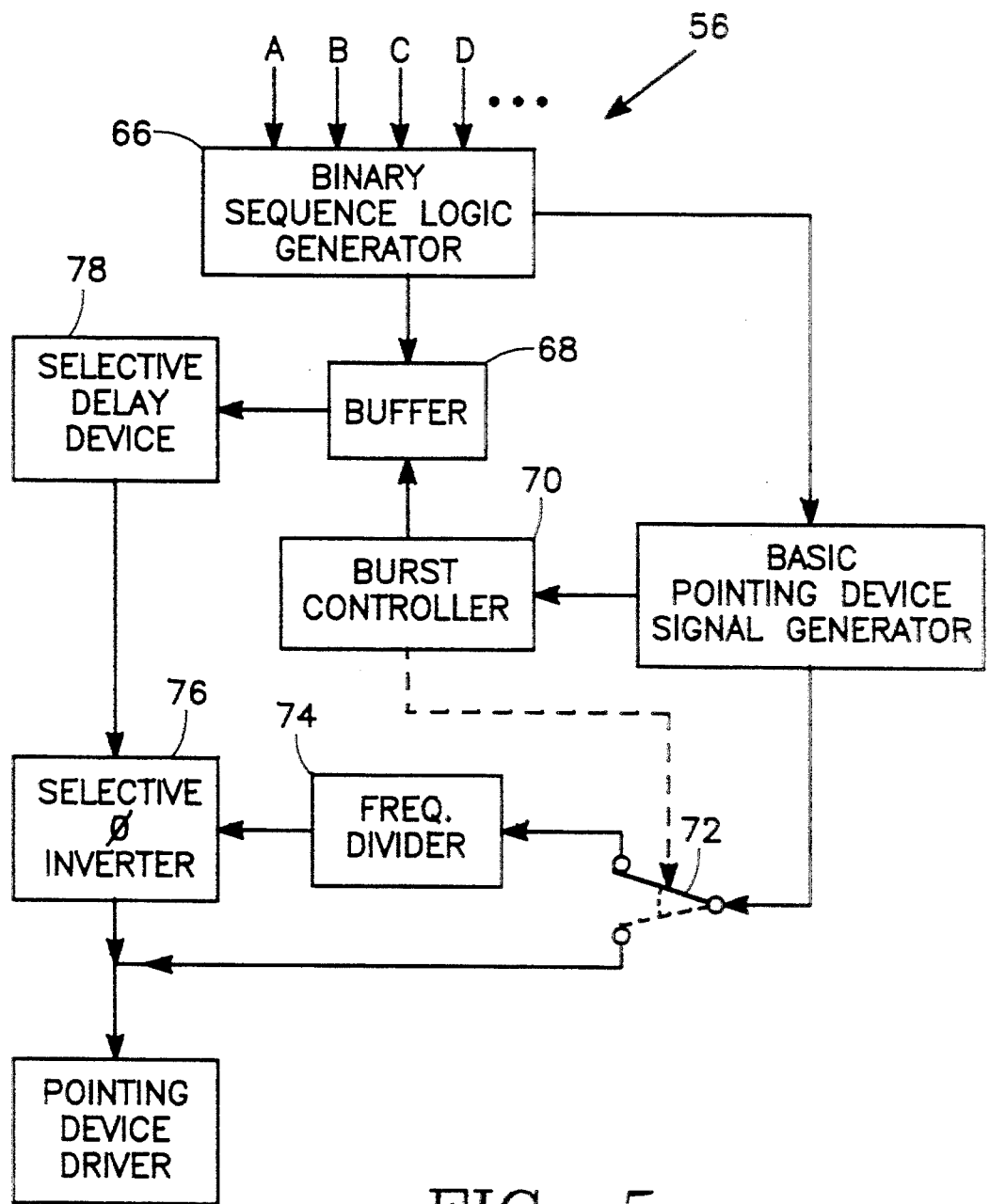
FIG. 5 is a simplified block diagram of the control logic element of FIG. 4.

Referring to FIG. 5, there is shown in block diagram form a circuit embodying the control logic 56 associated with the pointing device 50 of the present invention. Whenever, a pointing device button 58 is activated, the binary sequence logic generator 66 outputs a unique binary code associated with that particular button 58. In addition, the logic generator 66 outputs a signal which activates the aforementioned basic pointing device signal generator 54. The binary code output by the logic generator 66 is input to a buffer 68. The buffer 68 stores the binary code and sequentially outputs a signal representing each successive binary bit making up the code whenever an activation signal is received. In other words, each time the activation signal is received, the buffer 68 outputs a signal representing the next sequential bit in the code. The signal output by the buffer 68 has a low logic voltage level representing one of the binary states, and a high logic voltage level representing the other binary state. The activation signal is provided by the burst controller 70. The burst controller 70 is input with the basic pointing device signal from the basic pointing device signal generator 54 and is designed to output the activation signal having a duration equal to a predetermined number of cycles of the basic pointing device signal and a duty cycle of twenty-five (25) percent. The burst controller 70 also controls a switch 72. This switch 72 is set to route the basic pointing device signal to the pointing device driver 60 during the time the activation signal is not being generated by the burst controller 70, and set to route the basic pointing device signal through a frequency divider 74 during the period in which the activation signal is being generated. The frequency divider 74 outputs a lower frequency signal to a selective phase inverter 76. The selective phase inverter 76 inverts the lower frequency signal whenever enabled. The selective phase inverter 76 is enabled by the aforementioned binary bit signal output from the buffer 68 after passing through a selective delay device 78. A high logic level signal will enable the phase inverter 76, whereas a low logic level signal will not enable the phase inverter 76. In addition, whenever the binary bit signal is at the low logic level, it is passed undelayed through the selective delay device 78. If the binary bit signal is at the high logic level, it is first delayed by one cycle of the basic pointing device signal before being output to the selective phase inverter 76. Therefore, the signal output by the frequency divider 74 will be both delayed and inverted whenever the binary bit signal output by the buffer 68 is at the high logic level. It should be noted that the logic level convention just described in connection with the control logic 56 could be reversed, if desired, such that the lower frequency signal is delayed and inverted whenever the buffer 68 outputs at a low logic level.

Figure 6:
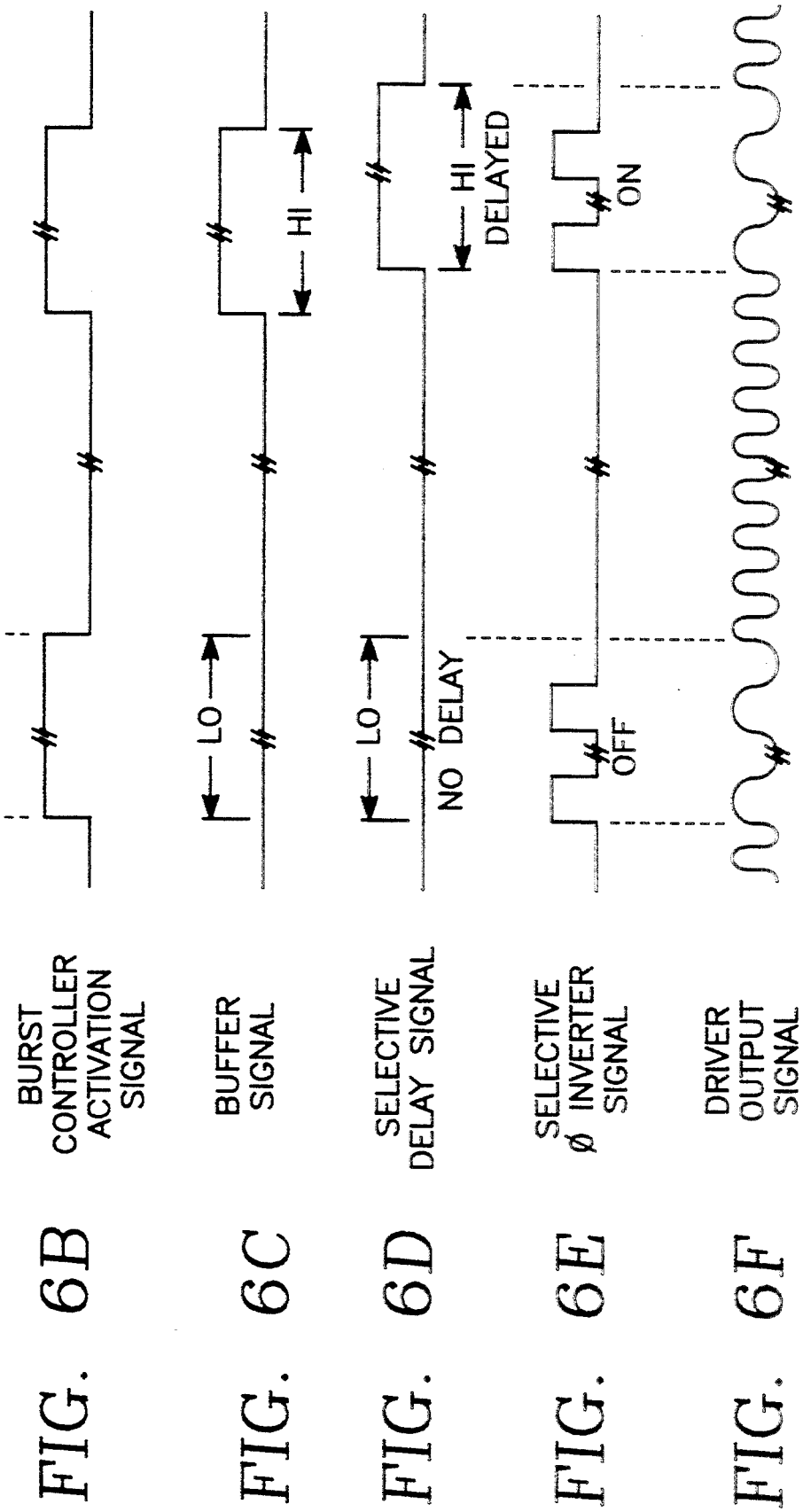
FIGS. 6a–f are graphs of the contemporaneous waveforms of a basic pointing device signal, burst controller activation signal, buffer signal, selective delay device signal, selective phase inverter signal, and driver output signal, respectively, associated with the pointing device of FIG. 4.

Referring to FIG. 6a–f, the effect the above described architecture has on the signal transmitted from the pointing device 50 can be seen. The waveforms depicted in FIGS. 6a and 6b show the basic pointing device frequency and the resulting activation signal output from the burst controller 70. The waveform depicted in FIG. 6c shows a low level binary bit signal followed by a high level binary bit signal exemplifying a possible portion of the binary code associated with one of pointing device buttons 58. As can be seen in FIG. 6d, the low level signal is passed undelayed through the selective inverter 76 and results in a non-inverted output from the selective inverter 76, as depicted in FIG. 6e. However, as FIG. 6d also shows, the selective inverter 76 delays the high level signal by one cycle of the basic pointing device signal, and the signal is inverted by the selective phase inverter 76, as depicted in FIG. 6e. The purpose for the delay in the inverted lower frequency signal output by the selective phase inverter 76, can be seen in the right side of the waveform illustrated in FIG. 6f. The delay causes the transition from the basic pointing device signal frequency to the lower frequency to occur on rising edge of the basic pointing device signal rather than a falling edge, thereby preventing a period of low level signal having a frequency lower than even the lower frequency signal. This ensures a smooth transition between frequencies. As can be seen in the left side of FIG. 6f, the delay is not required to obtain the same smooth transition when the lower frequency signal is not inverted.

Figure 7:
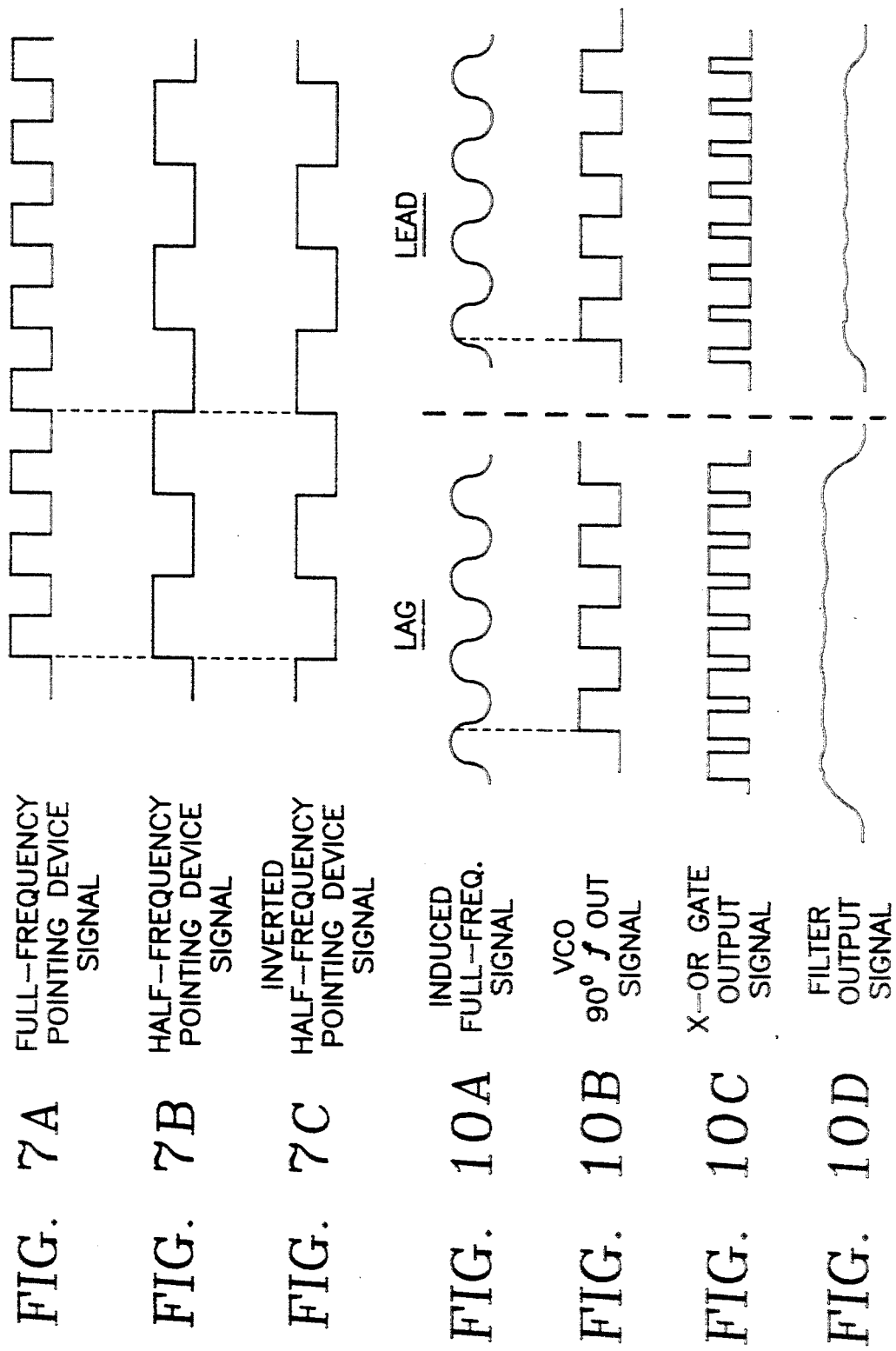
FIGS. 7a–c are graphs of the contemporaneous waveforms of a full-frequency pointing device signal, half-frequency pointing device signal, and inverted half-frequency pointing device signal, respectively, depicting the phenomenon whereby the transitions in a half-frequency signal correspond to the rising edges of a full-frequency signal from which the half-frequency signal was created.

It is noted that FIGS. 6a–f depict a lower frequency signal one-half that of the basic pointing device signal. This is the preferred embodiment of this invention. In this preferred embodiment, the frequency divider 74 produces a signal having one-half the frequency of the basic pointing device signal. The advantage of this half-frequency signal derives from a phenomenon whereby the rising edges of the full-frequency pointing device signal always occur at the transitions of the half frequency signal created from it, whether the half frequency signal is in phase or 180 degrees out of phase with the full-frequency signal. This phenomenon is illustrated in FIGS. 7a–c. Therefore, the phase of the full-frequency pointing device signal can be determined by detecting the transition points in the half frequency signal induced in the tablet conductors 12 of the digitizer tablet 14 by the half frequency pointing device signal, and knowing that these transitions correspond to the rising edges of the higher frequency pointing device signal. It does not matter whether the phase of the induced half frequency signal is inverted by 180 degrees from that of the pointing device signal as a result of the previously described condition caused by the looping of the conductors 12. The transitions in the induced half-frequency signal, rising or falling, will still occur at the rising edges of the full-frequency pointing device signal.

Therefore, the above described process of determining the pointing device signal's phase to resolve the position ambiguity, is made possible by comparing the occurrence of the transition points in the induced half-frequency signal to a signal "mirroring" the induced full-frequency signal induced in a conductor 12. The preferred method of creating the "mirrored" induced full-frequency signal is to use the signal when present to create a reference signal having the same frequency and phase. If the induced half-frequency signal transitions match up with the rising edges of the induced full-frequency signal, it is known that the induced full-frequency signal is approximately in phase with the corresponding pointing device signal. If, however, the induced half-frequency signal transitions occur at the falling edges of the induced full-frequency signal, it is instead known that the induced full-frequency signal is approximately 180 degrees out of phase with the pointing device signal. As described above, this information can then be used by the digitizer tablet electronics to determine the actual location of the pointing device. Even though the case where a half-frequency signal is employed is preferred, it is noted that other lower frequency signals could also be employed with the same result. For example, a one-quarter frequency signal would behave in the same way.

Since it does not matter whether the induced half-frequency signal is inverted for determining the phase of the full-frequency pointing device signal, this fact is exploited in the preferred embodiment for data transmission purposes. The pointing device 50 in this system inverts the phase of selected bursts of the half-frequency signal to impart the status of the pointing device buttons 22 to the tablet electronics as a binary code, where the phase state of a half-frequency burst would be compared to the immediately preceding burst. If the phase state is unchanged, this would represent one binary state. If the phase state has changed, this would represent the other binary state.

The digitizer tablet 14 in this system includes the usual sensing conductors 12 connected to a selector device 18, forming grids in each of two coordinate directions (only one selector and associated grid is shown in FIG. 2). It is preferred that the selector devices 18 are switched by a switching unit such that when one is providing a signal to the tablet electronics, the other is connected to the present invention. Therefore, the pointing device signal induced in a selected grid conductor 12 which is directly transferred to the tablet electronics is not the same signal routed to the present invention. The purpose for this feature is to select a grid conductor 12 with a relatively large magnitude signal as the copy of the induced pointing device signal to be provided to the present invention. This ensures a strong, clear signal is provided for the previously mentioned phase determination and signal decoding process. A selector logic unit which is used to control the selector devices 18 includes additional logic whereby, while one selector is providing a signal to the tablet electronics for phase comparison and extracting pointing device location data, the other selector searches for and provides a copy of the induced pointing device signal from a grid conductor 12 which has a large magnitude signal in relation to the other grid conductors 12 connected to that selector device 18. This selected signal can be, but need not be the largest signal available, as long as the signal is one that is relatively strong and clear.

The transmitted pointing device signal is received in the digitizer table and processed to determine the location of the pointing device and the status of the pointing device buttons as stated previously. In the present invention the phase of the full-frequency pointing device signal must be ascertained to determine pointing device position, and the phase of the induced half-frequency signal must be ascertained to determine the button status. These later two tasks are accomplished by creating a reference signal having the same frequency as and a known phase relationship to the aforementioned induced full-frequency pointing device signal. This reference signal is compared to the signal induced in a tablet conductor to generate the aforementioned phase state indications.

Figure 8:
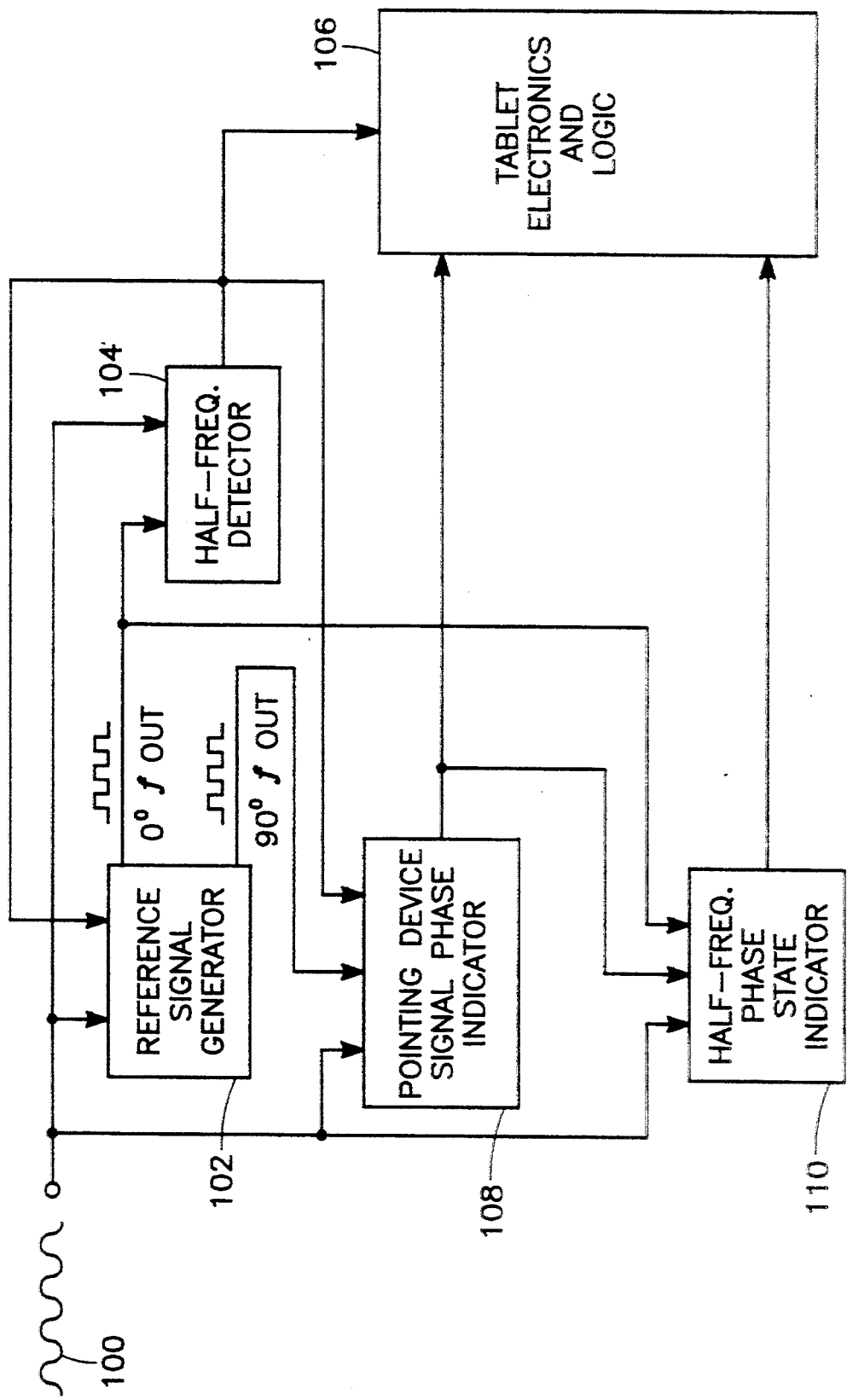
FIG. 8 is a simplified block diagram of the major elements associated with the present invention and their interconnections.

Referring to FIG. 8 there is shown in block diagram form a circuit embodying the preferred apparatus for accomplishing the just described tasks in the present invention. First, the signal 100 induced by the pointing device in the selected tablet conductor is used to create a reference signal having the same frequency as the aforementioned induced full-frequency pointing device signal. This takes place in a reference signal generator 102. Two versions of the reference signal are output from the reference signal generator 102. The first is approximately in phase with the induced full-frequency pointing device signal, and is labeled "0° f out". The second is approximately 90 degrees out of phase with the same induced signal, and is labeled "90° f out".

Next, the induced signal 100 from the selected conductor and the 0° f out signal are input into a half-frequency detector 104. This element detects whether the induced signal 100 is at one-half the frequency of the basic pointing device signal, as represented by the 0° f out signal. The half-frequency detector 104 outputs a half-frequency present signal for the approximate duration of the induced half-frequency signal. This signal is labeled "f/2 present" in FIG. 8. There are two purposes for this signal. First, it alerts the tablet electronics 106 that the pointing device is in its half-frequency output regime, thereby enabling the tablet electronics 106 to ignore the incoming induced half-frequency signal for purposes of determining pointing device position. Second, the f/2 present signal is fed back to the reference signal generator 102 for a purpose to be described later in connection with the specifics of the operation of the reference signal generator 102.

A pointing device signal phase indicator 108 processes the induced half-frequency signal from the selected conductor and the 90° f out signal from the reference signal generator 102, to produce a signal indicating whether the associated full-frequency signal induced in the selected conductor is closer to being in phase or 180 degrees out of phase with the full-frequency signal output by the pointing device. This output, which is labeled the "pointing device phase state signal" in FIG. 8, is provided to the tablet electronics 106 for the purpose of determining the pointing device location on the sensing surface of the tablet via the previously described process.

A half-frequency phase state indicator 110 processes the output of the pointing device signal phase indicator 108, the 0° f out signal from the reference signal generator 102, and the induced half-frequency signal taken from the selected conductor to create an output indicating whether the phase of the current half-frequency signal burst from the pointing device is approximately the same or inverted from the last half-frequency burst. This output, which is labeled the "half-frequency phase state" in FIG. 8, is provided to the tablet electronics 106 for determination of the pointing device button status. As described above, this interpretation is accomplished by designating a no change-in-phase condition to represent one binary state and a change-in-phase condition to represent the opposite binary state. In this way a binary encoded button status message can be imparted to the digitizer tablet electronics 106.

Accordingly, the phase of the full-frequency signal transmitting from the pointing device is determined, and the status of the pointing device buttons is relayed. In addition, both of these functions are performed using the same half-frequency signal bursts from the pointing device.

The following paragraphs provide a detailed description of the preferred embodiments of each of the above described elements comprising the present invention. However, other circuit configurations could apply. It is not intended that the present invention be limited to the particular circuits described below, and it is noted that any suitable circuit can be employed which accomplishes the functions associated with the above described elements.

The Reference Signal Generator 102

Figure 9:
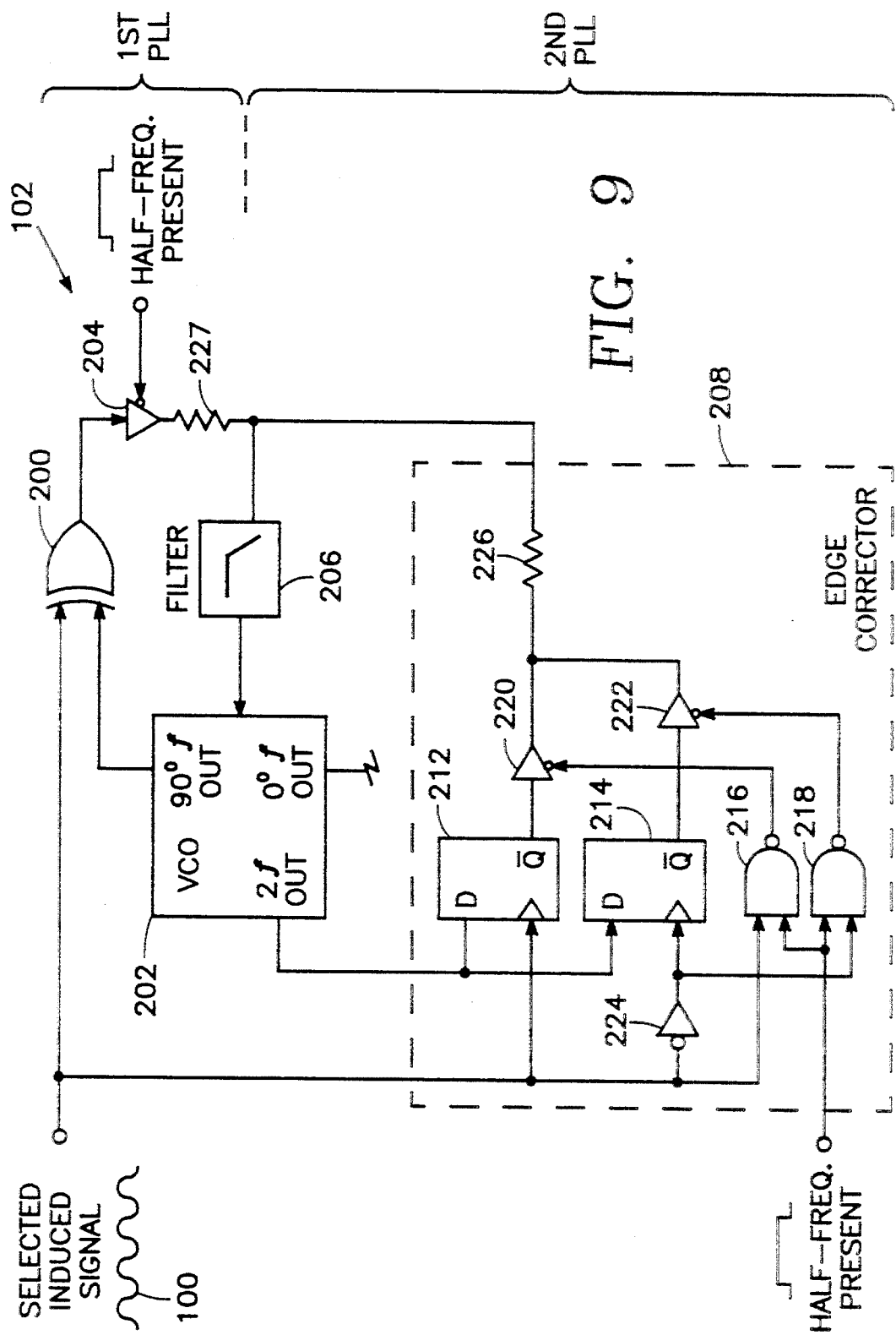
FIG. 9 is a schematic diagram of the reference signal generator of FIG. 8.

Referring to FIG. 9, the induced signal 100 from the selected conductor is injected into one input of an exclusive-OR gate 200. The other input of the gate 200 is connected to a 90° f output signal of a voltage controlled oscillator (VCO) 202. The VCO 202 is chosen to run at a base frequency twice that of the full-frequency signal of the pointing device, and so at twice the frequency of the induced full-frequency signal. The VCO 202 has three output signals. One output signal is at twice the frequency of the induced full-frequency signal and is designated "2 f out". The other two output signals from the VCO 202 are at the base frequency with one being approximately in phase and the other approximately 90 degrees out of phase with the induced full-frequency signal, respectively. These signals are designated "0° f out" and "90° f out". The output of the exclusive-OR gate 200 is coupled through a first tri-state buffer 204, a resistor 227 and a filter 206 to the control input of the VCO 202. The preceding circuit forms a first phase-lock loop (PLL) of the reference signal generator 102 which maintains the VCO 202 at twice the frequency of the induced full-frequency signal whenever the induced signal is at the full-frequency of the pointing device.

The induced signal 100 from the selected conductor is also injected into one input of an edge corrector device 208. The other input of the edge corrector 208 is connected to the 2 f out signal output of the VCO 202. The output of the edge corrector 208 is connected to the input of the filter 206. This circuit forms a second phase-lock loop (PLL) which maintains the VCO 202 at twice the frequency of the induced full-frequency signal whenever the induced signal is at half the full-frequency of the pointing device.

The two PLL circuits of the reference signal generator 102 are operated exclusive of each other. When the induced signal 100 is at full-frequency, the first PLL is active and the second PLL is blocked. When the induced signal 100 is at half-frequency, the second PLL is active and the first PLL is blocked. This activating and blocking is accomplished in the case of the first PLL by the tri-state buffer 204. As described previously, the half-frequency present signal output by the half-frequency detector 104 is fed back to the reference signal generator 102. This signal is injected into the enable/-disable input of the tri-state buffer 204 to block the buffer 204 whenever the pointing device 50 is in its half-frequency transmission mode.

The first PLL circuit operates as follows. Referring to FIGS. 9 and 10a–d, the induced signal 100, which is at full-frequency when the first PLL is active, and the 90° f out signal from the VCO 202 are input into the exclusive-OR gate 200. Because the two input signals are approximately 90 degrees out of phase with each other, as shown in FIG. 10a and 10b, the output of the gate 200 is a signal having approximately twice the frequency as the induced full-frequency signal when the VCO is running in phase with the induced signal. This output signal is depicted in FIG. 10c. The twice-frequency signal then passes through the first buffer 204 and into the filter 206. The filter 206 smoothes the signal to create a practically continuous waveform as shown in FIG. 10d. This filter output signal is used to control the VCO 202 and maintain it at the designated frequency and phase relationship. If the 90° f out signal from the VCO 202 begins to drift in phase in relation to the induced full-frequency signal, the output amplitude from the exclusive-OR gate 200 will change. If the 90° f out signal begins to lag, the output will be at a high voltage, and if the 90° f out signal starts to lead, a low voltage signal is output. In this way the VCO 202 is tuned to correct for any drift, so the frequency and phase of the VCO output signals are maintained at their desired states.

The second PLL circuit is structured as follows. Referring to FIGS. 9 and 11a–g, the induced signal 100, which is at half-frequency when the second PLL is active, and the 2 f out signal from the VCO 202 are input into the edge corrector device 208. The edge corrector 208 comprises first and second edge-triggered flip-flops 212, 214, first and second AND gates 216, 218, first and second tri-state buffers 220, 222, an inverter 224, and a resistor 226. The 2 f out signal from the VCO 202 is injected into the "D" inputs of each flip-flop 212, 214. The induced signal from the selected conductor is connected to the edge trigger input of the first flip-flop 212, and through an inverter 224 to the edge trigger input of the second flip-flop 214. The inverted "Q" output of the first flip-flop 212 is connected to the input of the first tri-state buffer 220. The inverted "Q" output of the second flip-flop is connected to the input of the second tri-state buffer 222. The induced signal from the selected conductor is also input into an input of the first NAND gate 216, while the other input of the first NAND gate 216 is connected to the output of the half-frequency detector 104. In addition, the output of the inverter 224 is connected to an input of the second NAND gate 218, while the other input of this NAND gate 218 is connected to the output of the half-frequency detector 104. The output of the first NAND gate 216 is connected to the enable/disable input of the first tri-state buffer 220, and the output of the second NAND gate 218 is connected to the enable/disable input of the second tri-state buffer 222. The outputs of the tri-state buffers 220, 222 are connected through a resistor 226 and the filter 206 to the control input of the VCO 202.

The edge corrector 208 operates by sampling the state of the 2 f out signal in relation to the induced half-frequency signal and outputs a correcting voltage signal to the VCO 202 when there is a drift in phase of the 2 f signal. This is accomplished by first sampling the state of the 2 f out signal using the leading edges of the induced half-frequency signal in the first flip-flop 212. If the state of the 2 f out signal is high when the leading edge of the induced half-frequency signal clocks the flip-flop 212, a low is output from the inverse "Q" output of the flip-flop 212. As seen in FIGS. 11a–b, this condition would occur if the 2 f out signal begins to lead the induced half-frequency signal. Should the 2 f out signal begin to lag the induced half-frequency signal, the 2 f out signal would be in a low state when the leading edge of the induced half-frequency clocked the first flip-flop 212, and so the inverse "Q" output would be high.

The inverse "Q" output of the first flip flop 212 then is fed into the first tri-state buffer 220. When the induced half-frequency signal is high, the first NAND gate 216 will output a low because, as will be explained below, the half-frequency present signal will be high. The low from the first NAND gate will enable the first tri-state buffer 220. Therefore, the signal output from the first flop 212 will pass through. When the induced half-frequency signal goes low again, the first NAND gate 216 will output a high, thereby disabling the first tri-state buffer 220, and blocking the inverse "Q" output signal of the first flip flop 212 from passing through. FIG. 11c illustrates the result of this process. As shown in FIGS. 11d–e, the same scenario occurs with the second flip-flop 214, second NAND gate 218 and second tri-state buffer 222, except that since the induced half-frequency input is inverted, the trailing edge of each pulse would trigger the second flip-flop 214, instead of the leading edge. Thus, the output of each flip flop 212, 214 is only passed through their respective tri-state buffers 220, 222 during the half-cycle of the selected induced signal immediately following the edge on which it is triggered. Since the outputs of the flip flops 212, 214 are tied together the signals combine to form the continuous signal seen in FIG. 11f. The purpose for the just described process is to reduce the response time of the edge corrector 208, increase the gain to provide better edge locking and to mitigate the effects of any noise in the induced signal which could mask an edge of the induced half-frequency signal. It should be noted that the inverted "Q" outputs of the first and second flip-flops 212, 214 will be in an unknown condition, designated by the "?" symbol in FIGS. 11c, e–f, prior to the occurrence of the induced half-frequency signal. This unknown condition is caused by the influence of the induced full-frequency signal on the flip-flops 212, 214. However, as the output of the second PLL is only allowed to control the VCO 202 during the half-frequency regime, this anomalous condition is irrelevant. Finally, the combined signal passes through the resistor 226 and the filter 206 to create an analog corrective voltage signal.

This corrective voltage signal output by the second PLL circuit controls the VCO 202 in the same way as the corrective voltage signals from the first PLL. The edge corrector 208 in the second PLL circuit will output a high corrective voltage signal when the VCO 202 output begins to lag and a low corrective voltage signal when the VCO 202 output begins to lead, just as occurs with the output of the exclusive-OR gate 200 and the filter 206 combination in the first PLL circuit. The first PLL circuit resistor 227 and the second PLL circuit resistor 226 are chosen to set the amount of influence the respective PLL circuits assert over the VCO control input. The filter 206 smoothes the signal to create the practically continuous waveform shown in FIG. 11g. Accordingly, the VCO 202 is tuned to correct for any drift, so the frequency and phase of the VCO output signals are maintained at their desired states whether the induced signal 100 is at full-frequency or half-frequency.

The Half-Frequency Detector 104

Figure 12:
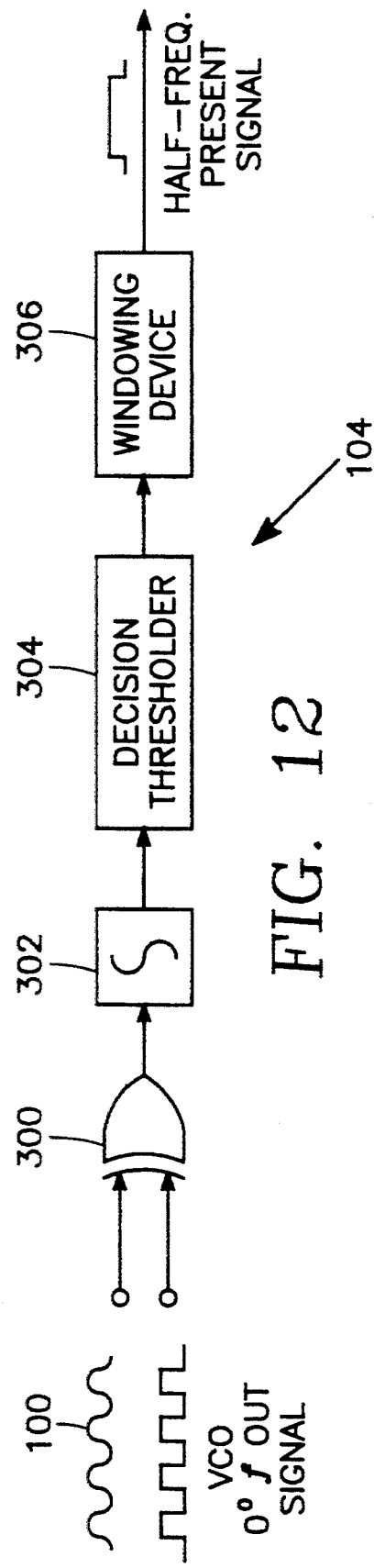
FIG. 12 is a schematic diagram of the half-frequency detector of FIG. 8.

Referring to FIG. 12, in the half-frequency detector 104, the induced signal 100 from the selected conductor is injected into one input of an exclusive-OR gate 300. The other input of the gate 300 is connected to the 0° f output signal from the voltage controlled oscillator (VCO) 202 of the reference signal generator 102. The output of the gate 300 is connected to a signal integrator 302. This signal integrator 302 can be an analog integrator, or a digital counter. The output of the signal integrator 302 is connected to a decision thresholder device 304. The output of the decision thresholder 304 is then connected to a windowing device 306. The windowing device can be a digital counter which outputs a signal for a specific period of time.

The half-frequency detector 104 operates as follows. Referring to FIGS. 12 and 13a–f, the exclusive-OR gate compares the 0° f output signal from the voltage controlled oscillator (VCO) 202 with the induced signal 100. When the induced signal 100 constitutes the aforementioned induced full-frequency signal, a continuous low is output from the exclusive-OR gate 300, shown in the left-hand side of FIGS. 13a–c. Therefore, the integrated signal from the signal integrator 302, never reaches the decision threshold level required to activate the decision thresholder 304. Accordingly, the windowing device 306 is not activated and no signal is output from the half-frequency detector 104. However, when the induced signal 100 constitutes the aforementioned induced half-frequency signal, a signal corresponding to the induced half-frequency signal but 90 degrees out of phase therewith is output from the exclusive-OR gate 300, shown in the right-hand side of FIGS. 13a–c. The signal output by the exclusive-OR gate 300 is integrated by the signal integrator 302 and output to the decision thresholder 304. When the integrated signal reaches the decision threshold level required to activate the decision thresholder 304, a signal is output to the windowing device 306. The windowing device 306 is then activated and outputs a high level signal for a predetermined period of time. This predetermined period of time is selected to be the remainder of period of time the pointing device 50 is designed to output each of its half-frequency signal bursts after detection by the half-frequency detector 104. The process from the signal integrator 302 on is depicted in FIGS. 13d–f.

The output signal from the windowing device 306 constitutes the aforementioned half-frequency present signal from the half-frequency detector 104. Accordingly, it is the output of the windowing device 306 which is connected to the first and second tri-state buffers 204, 210 of the reference signal generator 102, via their enable/disable inputs. It is also connected to one of the inputs of each of the first and second AND gates 216, 218 of the edge corrector 208 in the reference signal generator 102. It should also be remembered that the half-frequency present signal is provided to the tablet electronics 106 to indicate the pointing device is in its half-frequency output regime, thereby enabling the tablet electronics 106 to ignore the incoming induced half-frequency signal for purposes of determining pointing device position.

The Pointing Device Signal Phase Indicator 108

Figure 14:
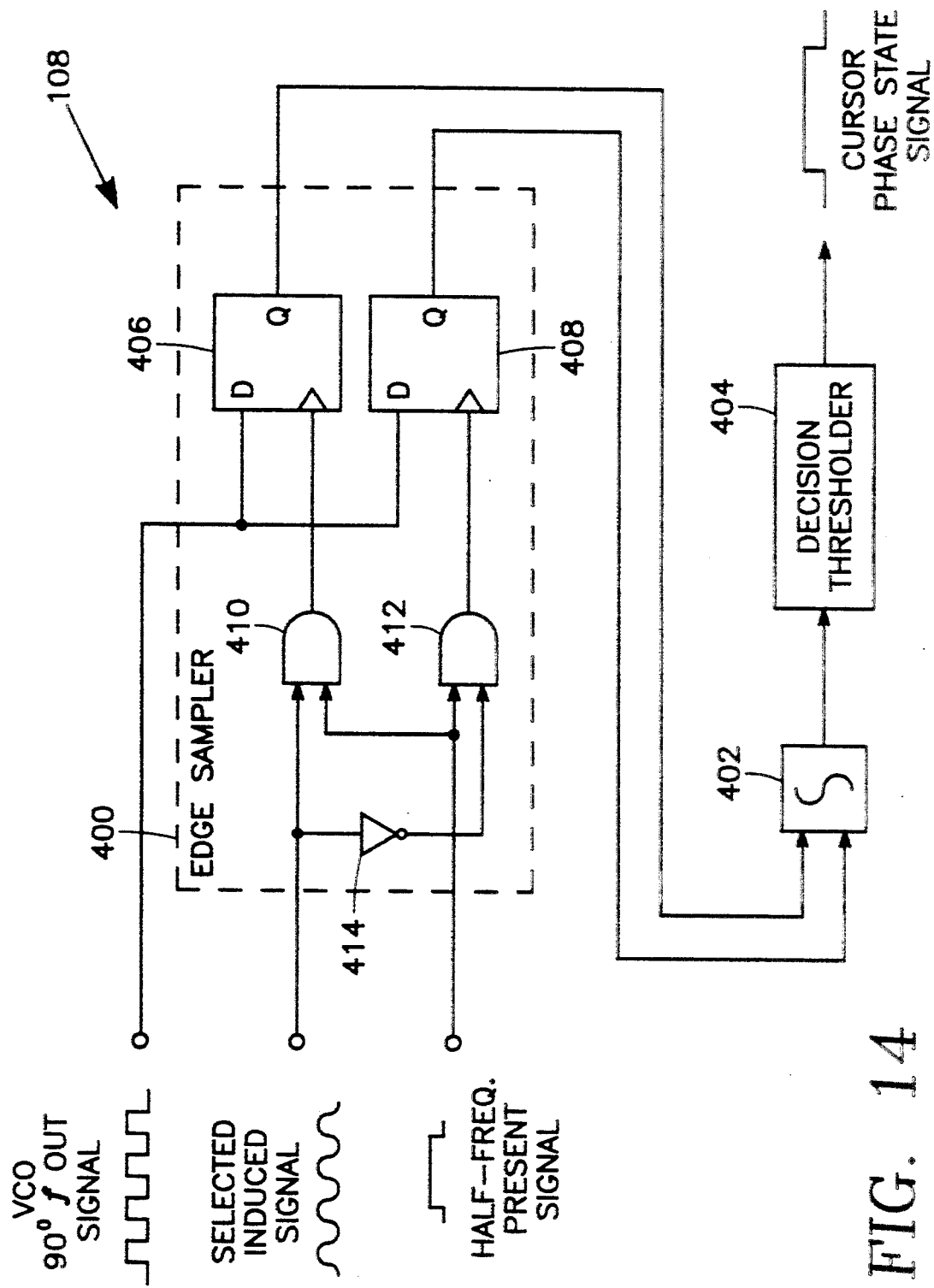
FIG. 14 is a schematic diagram of the pointing device signal phase indicator of FIG. 8.

Referring to FIG. 14, the induced signal 100 from the selected conductor is injected into one input of an edge sampler device 400. Another input of the edge sampler 400 is connected to the 90° f output signal from the voltage controlled oscillator (VCO) 202 of the reference signal generator 102. A third input of the edge sampler 400 is connected to the output of the half-frequency detector 104. The outputs of the edge sampler 400 is connected to a signal integrator 402. This signal integrator 402 can be an analog integrator, or a digital counter just as the similar unit in the half-frequency detector 104. The output of the signal integrator 402 is connected to a decision thresholder device 404.

The edge sampler 400 comprises first and second edge-triggered flip-flops 406, 408, first and second AND gates 410, 412, an inverter 414, and a summing device 416. The aforementioned 90° f output signal from the voltage controlled oscillator (VCO) 202 is injected into the "D" inputs of each flip-flop 406, 408. The induced signal 100 from the selected conductor is connected to an input of the first AND gate 410, while the other input of the first AND gate 410 is connected to the output of the half-frequency detector 104. The output of the first AND gate 410 is connected to the edge trigger input of the first flip-flop 406. The induced signal 100 is inverted by the inverter 414 and injected into one of the inputs of the second AND gate 412. The other input of the second AND gate 412 is connected to the output of the half-frequency detector 104. The output of the second AND gate 412 is connected to the edge trigger input of the second flip-flop 408. The "Q" outputs of the first and second flip-flops 406, 408 are connected to the aforementioned signal integrator 402.

Figure 15A:
FIGS. 15a–g are graphs of the contemporaneous waveforms of an induced half-frequency signal, half-frequency present signal, first AND gate output signal, VCO 90° f out signal (inverted), first flip-flop "Q" output signal (180 degrees out of phase), 90° f out signal (in-phase), first flip-flop "Q" output signal (in-phase), respectively, associated with the circuit of FIG. 14.
Figure 15B:
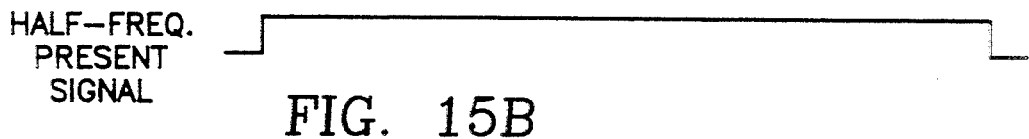
Figure 15C:
Figure 15D:
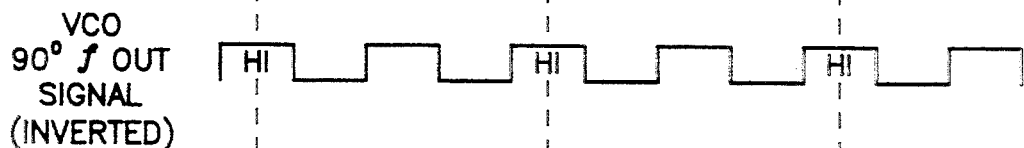
Figure 15E:
Figure 15F:
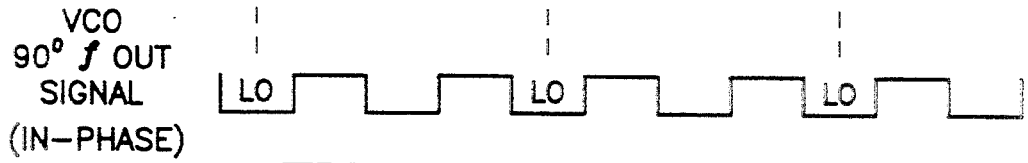
Figure 15G:

The edge sampler 400 operates as follows. Whenever the induced signal is a half-frequency signal, the half-frequency detector 104 produces the half-frequency detected signal, enabling the first and second AND gates 410, 412. As a result, the first AND gate 410 outputs a digitized copy of the induced half-frequency signal, as shown in FIGS. 15a–b, while the second AND gate 412 outputs a digitized copy of the inverted induced half-frequency signal. These signals trigger the first and second flip-flops 406, 408, respectively. Therefore, the state of the 90° f output signal is sampled in the first flip-flop 406 using the leading edges of the digitized copy of the induced half-frequency signal output from the first AND gate 410. If the state of the 90° f output signal is high when the leading edge of the digitized copy of the induced half-frequency signal clocks the first flip-flop 406, a high is output from its "Q" output. This condition would occur if the induced full-frequency signal were closer to being 180 degrees out of phase with the full frequency signal output by the pointing device. That this is so can be seen in FIGS. 15c–e. It should be remembered that the transitions in the induced half-frequency signal occur at the leading edges of the induced full-frequency signal if the induced full-frequency signal is in phase with the full-frequency signal output by the pointing device, and occur at the trailing edges if the induced full-frequency signal is 180 degrees out of phase with the full-frequency pointing device signal. The 90° f output signal is used instead of the 0° f output signal so as to center the transitions of the copy of the induced half-frequency in one state or the other in the 90° f output signal. This compensates for any noise or slight deviation in phase between the reference signals and the pointing device signal. Since the 90° f output signal will "lead" the induced full-frequency signal, the transitions of the copy of the induced half-frequency signal will occur at about the middle of the high states of the 90° f output signal when the induced full-frequency signal from which the 90° f output signal is generated is approximately 180 degrees out of phase with the full-frequency pointing device signal. Accordingly, the first flip-flop 406 would be clocked when the "D" input is high, thereby producing a high signal at the "Q" output. Conversely, as shown in FIGS. 15c, f–g, when the 90° f output signal corresponds to an induced full-frequency signal that is in-phase with the full-frequency pointing device signal, the transitions in the copy of the induced half-frequency signal occur at about the middle of the low states in the 90° f output signal. Therefore, a low is produced at the "Q" output of the first flip-flop 406 because the 90° f output signal is low when the leading edge of the copy of the induced half-frequency signal clocks the flip-flop 406.

The same signal flow occurs in the second flip-flop 408, except that since the induced half-frequency input is inverted, the trailing edge of each pulse would trigger the second flip-flop 408, instead of the leading edge. The purpose for this redundancy is to mitigate the effects of any noise in the induced signal which could mask an edge of the induced half-frequency signal. The outputs of the flip-flops 406, 408 are integrated together. In an ideal case, where no noise exists, the strength of the signal output from the edge corrector 208 would be doubled.

When there is no half-frequency detected signal output by the half-frequency detector 104, the AND gates 410, 412 are disabled and a low is output. Therefore, the flip-flops 406, 408 are not triggered and they do not change state. Accordingly, when there is no half-frequency signal being induced in the selected conductor, the edge sampler 400 output does not change.

As stated above, the outputs of the edge sampler 400 is connected to the signal integrator 402. When the edge sampler is outputting a low level signal as when the induced full-frequency signal is in-phase with the full-frequency pointing device output signal, the integrated signal from the signal integrator 402 never reaches the decision threshold level required to activate the decision thresholder 404. Therefore, no signal is output from the pointing device signal phase indicator 108. When the edge sampler is outputting a high level signal, thus indicating an approximately 180 degrees out of phase condition between the induced full-frequency signal from the selected conductor and the full-frequency pointing device output signal, the integrated signal from the signal integrator 402 will exceed a predetermined threshold level. At that point, the decision thresholder 404 will be activated and will output a high level signal.

The output of the decision thresholder 404 constitutes the pointing device phase state signal. This signal, which indicates either an in-phase or out of phase condition, is compared by the tablet electronics 106 with the induced signal from the selected conductor to determine the phase of the pointing device signal. It is noted that the edge sampler output during the times when the induced half-frequency signal is not present, could mirror the edge sampler output when the induced full-frequency signal is in-phase with the full-frequency pointing device signal. However, as discussed above, the tablet electronics 106 are supplied with a half-frequency present signal. This signal is used in the tablet electronics 106 to indicate when the pointing device signal phase indicator 108 is providing phase information, and when its not. Therefore, the output of the pointing device signal phase indicator 108 during those times when the induced half-frequency is not present is ignored by the tablet electronics 106.

The Half-Frequency Phase State Indicator 110

Figure 16:
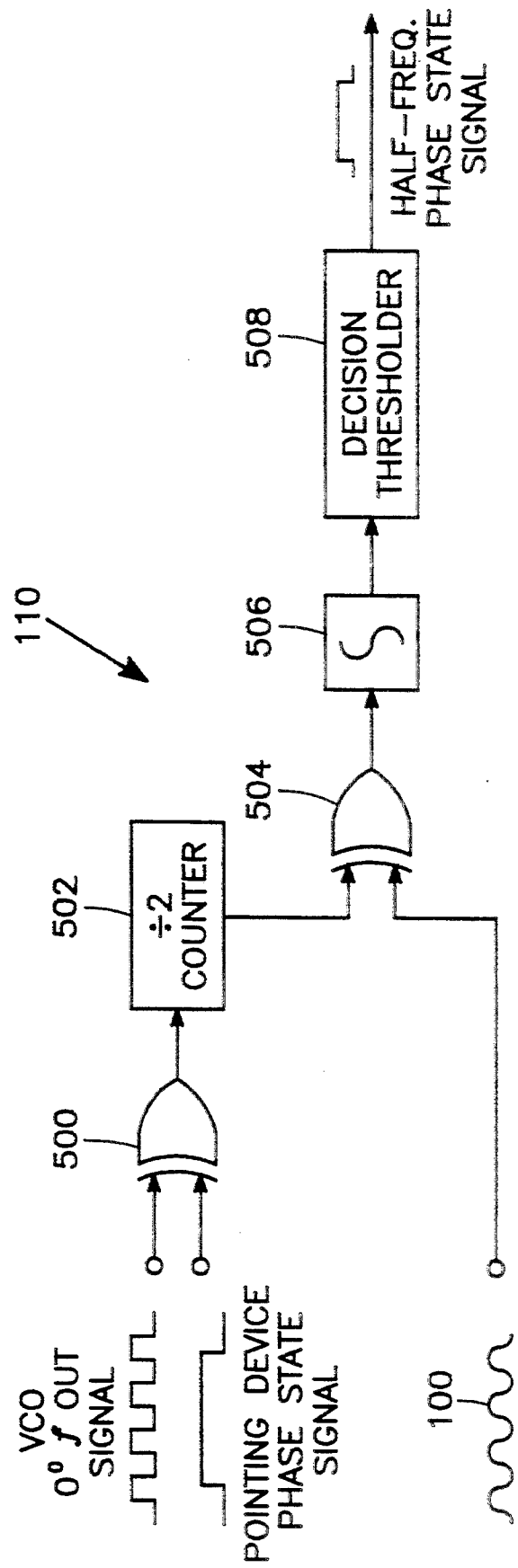
FIG. 16 is a schematic diagram of the half-frequency phase state indicator of FIG. 8.

Referring the FIG. 16, the 0° f output signal from the voltage controlled oscillator (VCO) 202 of the reference signal generator 102 is injected into one input of a first exclusive-OR gate 500. The other input of the first gate 500 is connected to the output of the pointing device signal phase indicator 108. The output of the first gate 500 is connected to the input of a divide-by-two counter 502, and the output of the counter 502 is connected to one input of a second exclusive-OR gate 504. The other input of the second gate 504 is provided with the induced signal 100 from the selected conductor. The output of the second gate 504 is connected to a signal integrator 506. As with the signal integrators 302, 402 used in other pads of the present invention, this unit 504 can be an analog device or a digital counter. The output of the signal integrator 506 is connected to a decision thresholder device 508.

Figure 17A:
FIGS. 17a–h are graphs of the contemporaneous waveforms of a VCO 0° f out signal, pointing device phase state signal, first X-OR gate output signal, divide-by-two counter output signal, induced half-frequency signal (in and out of phase), second X-OR gate output signal (in and out of phase), integrator output signal (in and out of phase), and decision thresholder output signal (in and out of phase), respectively, associated with the half-frequency regime of the circuit of FIG. 16.
Figure 17B:
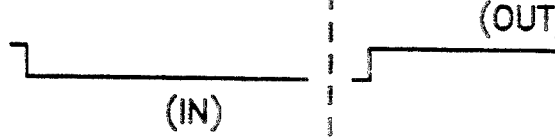
Figure 17C:
Figure 17D:

The half-frequency phase state indicator 110 operates as follows. Referring to FIGS. 16 and 17a–h, the first exclusive-OR gate 500 compares the 0° f output signal from the voltage controlled oscillator (VCO) 202 with the pointing device phase state signal from the pointing device signal phase indicator 108. This produces a signal at the output of the first gate 500 which is essentially in-phase with the full-frequency pointing device signal. As can be seen in FIGS. 17a–c, if the 0° f output signal is closer to being in-phase with the full-frequency pointing device signal, and so indicated by the low level pointing device signal phase state signal, a unchanged copy of the 0° f output signal is output from the first gate 500. However, if the 0° f output signal is closer to being 180 degrees out of phase with the full-frequency pointing device signal, and so indicated by the high level pointing device signal phase state signal, an inverted copy of the 0° f output signal emerges from the first gate 500. This inverted copy will be substantially in-phase with the full-frequency pointing device signal. Next, as shown in FIG. 17d, the output signal of the first gate 500 is divided in frequency by one-half using the divide-by-two counter 502. The signal that emerges will have its rising edges corresponding to the rising edges of the phase-corrected 0° f output signal. As described previously, a similar signal is generated in the pointing device of this system from the full-frequency pointing device signal to establish a reference to vary the phase of the half-frequency signal bursts. Therefore, the output of the counter 502 represents a half-frequency reference signal which can be used to compare the phase of the induced half-frequency signal bursts. It should be mentioned that it does not matter if the induced half-frequency signal that is used to compare with the created half-frequency reference is inverted due to the looping of the conductors in the digitizer tablet because only the changes in phase state matter, not the state itself.

Figure 17E:
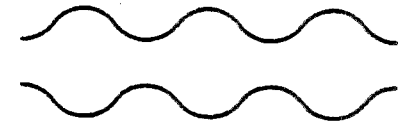
Figure 17F:
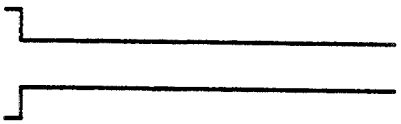

The created half-frequency reference signal from the counter 502, is injected into one input of the second exclusive-OR gate 504. This signal is compared to the induced signal 100 taken from the selected conductor and injected into the other input of the second gate 504. Referring to FIGS. 17e–f, if the induced signal 100 is in the half-frequency regime and is substantially in-phase with the created half-frequency reference signal, a continuous low level signal is output by the second gate 504. If, however, the induced half-frequency signal is substantially inverted from the created half-frequency reference signal, a continuous high level signal is output by the second gate 504.

Figure 17G:
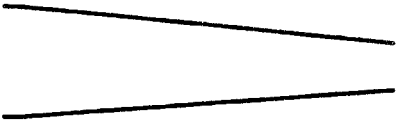
Figure 17H:
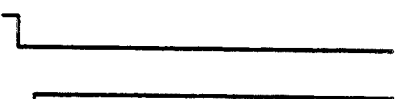

The output from the second gate 504 is then integrated in the signal integrator 506 and provided to the decision thresholder 508. As shown in FIGS. 17g–h, if the output from the second gate 504 is low, the integrated signal would not reach a predetermined threshold limit, and there would be no output from the decision thresholder 508. If the output from the second gate 504 is high, the integrated signal would exceed a predetermined threshold limit, and the output from the decision thresholder 508 would be high.

The output from the decision thresholder 508 constitutes the half-frequency phase state signal. This signal, is provided to the tablet electronics 106 which determines if the signal has change from that immediately preceding it. It should be remembered that the tablet electronics 106 is supplied with the half-frequency present signal from the half-frequency detector 104. Therefore, the tablet electronics 106 is also supplied with the information necessary to know when a half-frequency phase state signal is expected, so that any change in phase state can be determined. Thereafter, the status of the pointing device buttons can be determined from the decoding of the binary message so imparted to the tablet electronics 106 by any well known decoding circuit therein.

When the induced signal 100 is in the full-frequency regime, the resulting processing by the half-frequency phase state indicator 108 is depicted in FIGS. 18a–e. The half-frequency reference signal is created as before, but is compared to the induced full-frequency signal in the second gate 504. The results of this processing is shown in FIGS. 18a–c. As can be seen the output of the second gate 504 is a half-frequency signal skewed by 90 degrees from the half-frequency reference signal and not a continuous signal. Referring to FIGS. 18d–e, it can be seen that the integrated signal from the signal integrator 506 would never reach the aforementioned predetermined threshold limit. The threshold limit can be chosen to specifically preclude this possibility. Therefore, there is no output from the decision thresholder 508. This would create an anomalous situation, since the lack of a signal from the decision thresholder 508 also equates to the same-phase-state condition in the half-frequency regime. However, as stated above, the tablet electronics 106 are designed to only look for the no signal condition during those times the induced half-frequency signal is present.

Tablet Electronics 106

The tablet electronics 106 utilized in the present invention includes some additional features not found in prior art devices. The tablet electronics 106 includes the ability to ignore the induced signal 100 during those periods when the pointing device 50 is transmitting in the half-frequency regime, in association with the aforementioned phase comparison process used to determine pointing device 50 location on the sensing surface 20. In the present invention, the half-frequency present signal is used for these purposes. The logic required to decode the same-phase-state/changed-phase-state information from the pointing device signal phase indicator 108 is also included in the tablet electronics 106 employed in the present invention. Other additional features include the ability to ignore the output signals from the pointing device signal phase indicator 108 and the half-frequency phase state indicator 110, except during those periods when the pointing device 50 is transmitting in the half-frequency regime.

These additional features included in the tablet electronics 106 involve simple modifications to the tablet electronics logic circuits. The methods and devices employed to create such additional logic functions are well known in the art. Therefore, no detailed description of these additional logic features is included herein.

While the invention has been described in detail by reference to the preferred embodiment described above, it is understood that variations and modifications thereof may be made without departing from the true spirit and scope of the invention.

Wherefore, what is claimed is:

1. A cordless digitizer comprising:
   a) a pointing device capable of separately transmitting first and second alternating current (AC) magnetic field signals, said pointing device second signal having a lower frequency than said pointing device first signal and being in one of two phase states differing by 180 degrees; and,
   b) a tablet including,
      b1) a means for indicating the phase of said pointing device first signal, from a full-frequency signal and a lower-frequency signal induced in a sensing conductor, wherein said induced full-frequency signal is induced by said pointing device first signal and said induced lower-frequency signal is induced by said pointing device second signal, and,
      b2) a means for determining if the phase of said lower-frequency signal induced in said sensing conductor by said pointing device is approximately the same or approximately inverted in comparison to a lower-frequency reference signal, said lower-frequency reference signal being generated by electronics disposed in the tablet and having essentially the same frequency as the lower-frequency signal induced in said sensing conductor.

2. The cordless digitizer of claim 1, wherein said pointing device second signal has one-half the frequency of the pointing device first signal, and said pointing device first signal phase indicating means comprises:
  a) a reference signal generating means for providing reference signals having about the same frequency as said induced full-frequency signal wherein a first reference signal is approximately in phase with said induced full-frequency signal and a second reference signal has a phase about 90 degrees skewed from said induced full-frequency signal, said reference signals being provided in response to inputs of said induced full-frequency signal whenever said pointing device is transmitting said pointing device first signal and an induced half-frequency signal whenever said pointing device is transmitting said pointing device second signal;
  b) a half-frequency signal present indicating means for providing a half-frequency present signal indicating said pointing device is transmitting said pointing device second signal, said half-frequency present signal being provided in response to inputs of a signal induced by said pointing device in said conductor and said first reference signal; and,
  c) a pointing device signal phase indicator means for providing a pointing device phase state signal indicating whether said induced full-frequency signal is closer to being one of (i) in phase with, and (ii) 180 degrees out of phase with said pointing device first signal, said pointing device phase state signal being provided in response to inputs of said induced half-frequency signal and said second reference signal.

3. The cordless digitizer of claim 2, wherein said induced half-frequency signal phase determining means comprises:
  a) said reference signal generating means;
  b) said half-frequency signal present indicating means;
  c) said pointing device signal phase indicator means; and,
  d) a half-frequency phase state indicator means for providing a half-frequency phase state signal indicating whether said induced second signal has one of (i) a phase substantially the same as, and (ii) a phase about 180 degrees different from a half-frequency reference signal, said half-frequency phase state signal being provided in response to inputs of said half-frequency reference signal which is formed by comparing said first reference signal and said pointing device phase state signal, and said induced half-frequency signal.

4. The cordless digitizer of claim 3, wherein said reference signal generating means comprises:
  a) a first phase-lock loop (PLL) means for providing said first and second reference signals whenever said induced full-frequency signal is present at an input of said reference signal generating means, said first PLL means including a means for enabling said first PLL means only when said induced full-frequency signal is present at said reference signal generating means input; and,
  b) a second phase-lock loop (PLL) means for providing said first and second reference signals whenever said induced half-frequency signal is present at said reference signal generating means input, said second PLL means including a means for enabling said second PLL only when said induced half-frequency signal is present at said reference signal generating means input.

5. The cordless digitizer of claim 4, wherein said first PLL means comprises:
  a) a voltage controlled oscillator (VCO) running at a base frequency twice that of said induced full-frequency signal and including,
    a1) a first output for outputting a signal at a frequency about twice that of said induced full-frequency signal,
    a2) a second output for outputting a signal having approximately the same frequency and phase as said induced full-frequency signal,
    a3) a third output for outputting a signal having approximately the same frequency as, but 90 degrees out of phase as said induced full-frequency signal, and,
    a4) a control input for inputting voltage signals for maintaining said VCO base frequency at twice that of said induced full-frequency signal;
  b) an exclusive-OR gate including,
    b1) a first input for inputting said induced full-frequency signal and said induced half-frequency signal, whichever is present,
    b2) a second input connected to said third VCO output, and,
    b3) an output for outputting a digital signal at a frequency approximately twice that of said induced full-frequency signal;
  c) a tri-state buffer with an input connected to said exclusive-OR gate output wherein whenever said half-frequency present signal is not present at an enable/disable input of said tri-state buffer said signal output from said exclusive-OR gate is allowed to pass through to an output, whereas when said half-frequency present signal is present at said enable/disable input no signal is allowed to pass;
  d) a resistor having an input connected to said tri-state buffer output, and an output; and,
  e) a filter including,
    e1) an input connected to said tri-state buffer output wherein whenever said digital signal is output from said exclusive-OR gate and allowed to pass through said tri-state buffer, said digital signal is smoothed such that it becomes a substantially continuous analog voltage signal, and,
    e2) an output connected to said VCO control input for outputting said analog voltage signal.

6. The cordless digitizer of claim 5, wherein said second PLL means comprises:
  a) said voltage controlled oscillator (VCO);
  b) an edge corrector means including,
    b1) a first input for inputting said induced full-frequency signal and said induced half-frequency signal, whichever is present,
    b2) a second input connected to said first VCO output,
    b3) a means for preventing an output signal from said edge corrector means if said induced half-frequency signal is not present at said first edge corrector input; and
    b4) an output for outputting a digital signal having a higher voltage if the phase of said first VCO output signal is leading that of said induced half-frequency signal, and a lower voltage if the phase of said first VCO output signal is lagging that of said induced half-frequency signal; and, c) said filter wherein additionally said filter input is connected to said edge corrector means such that whenever said digital signal is output from said edge corrector means, said digital signal is smoothed so as to becomes a substantially continuous analog voltage signal.

7. The cordless digitizer of claim 6, wherein said edge corrector means comprises:
   a) a first flip-flop including,
      a1) a "D" input for inputting said first VCO output signal,
      a2) an edge trigger input for inputting said induced full-frequency signal and said induced half-frequency signal, whichever is present at said edge trigger input,
      a3) an inverted "Q" output for outputting a low whenever said first VCO output signal is high and said edge trigger input is high, and a high whenever said first VCO output is low and said edge trigger input is high;
   b) an inverter with an input for inputting said induced full-frequency signal and said half-frequency signal, whichever is present at said inverter input, and an output for outputting an inverted version of said inputted signals;
   c) a second flip-flop including,
      c1) a "D" input for inputting said first VCO output signal,
      c2) an edge trigger input connected to said inverter output for inputting said inverted version of said induced full-frequency signal and said induced half-frequency signal, whichever is present at said edge trigger input,
      c3) an inverted "Q" output for outputting a low whenever said first VCO output signal is high and said edge trigger input is high, and a high whenever said first VCO output is low and said edge trigger input is high;
   d) a first NAND gate including,
      d1) a first input for inputting a signal indicating the presence of said induced half-frequency signal at said first flip-flop edge trigger input and said inverter input,
      d2) a second input for inputting said induced full-frequency signal and said half-frequency signal, whichever is present at said first NAND gate second input;
   e) a second NAND gate including,
      e1) a first input for inputting a signal indicating the presence of said induced half-frequency signal at said first flip-flop edge trigger input and said inverter input,
      e2) a second input for inputting said inverted version of said induced full-frequency signal and said half-frequency signal, whichever is present at said second NAND gate second input;
   f) a first tri-state buffer including,
      f1) an input connected to said inverted "Q" output of said first flip-flop;
      f2) an enabling/disabling input connected to said first NAND gate inverting output;
      f3) an output which outputs a signal output from said inverted "Q" output of said first flip-flop whenever said first NAND gate enables said first tri-state buffer;
   g) a second tri-state buffer including,
      g1) an input connected to said inverted "Q" output of said second flip-flop;
      g2) an enabling/disabling input connected to said second NAND gate inverting output;
      g3) an output which outputs a signal output from said inverted "Q" output of said second flip-flop whenever said second NAND gate enables said second tri-state buffer; and,
   h) a resistor having an input connected to said first tri-state buffer output and said second tri-state buffer output, and an output.

8. The cordless digitizer of claim 3, wherein said half-frequency signal present indicator means comprises:
   a) an exclusive-OR gate including,
      a1) a first input for inputting said induced full-frequency signal and said induced half-frequency signal, whichever is present at said first exclusive-OR gate input,
      a2) a second input for inputting said first reference signal from said reference signal generator means,
      a3) an output providing an output signal;
   b) a signal integrator means having an input connected to said exclusive-OR gate output for providing an integrated signal at an output wherein said integrated signal is produced from said output signal from said exclusive-OR gate;
   c) a decision thresholder means having an input connected to said signal integrator means output for providing a signal at an output whenever said integrated signal exceeds a predetermined threshold level; and,
   d) a windowing means having an input connected to said decision thresholder means output for providing at an output said half-frequency present signal for a predetermined period of time in response to said decision thresholder output signal, said predetermined period of time being substantially equal to the period of time said pointing device outputs said signal having one-half the frequency of said full-frequency inducing signal.

9. The cordless digitizer of claim 3, wherein said pointing device signal phase indicator means comprises:
   a) an edge sampler means providing a low level signal when said induced full-frequency signal is closer to being in phase with said full-frequency inducing signal transmitting from said pointing device and a high level signal when said induced full-frequency signal is closer to being 180 degrees out of phase with said full-frequency inducing signal transmitting from said pointing device, in response to a comparison of said induced half-frequency signal and said second reference signal, including,
      a1) a first input for inputting said induced full-frequency signal and said induced half-frequency signal, whichever is present at said first edge sampler input,
      a2) a second input for inputting said second reference signal from said reference signal generator means,
      a3) a third input for inputting said half-frequency present signal from said half-frequency signal indicating means, and,
      a4) a pair of output for outputting one of said high level signal and said low level signal;
   b) a signal integrator means having inputs respectively connected to said edge sampler means outputs for providing an integrated signal at an output wherein said integrated signal is produced from said output signal from said edge sampler means; and, c) a decision thresholder means having an input connected to said signal integrator means output for providing a high level pointing device phase state signal at an output whenever said integrated signal exceeds a predetermined threshold level.

10. The cordless digitizer of claim 9, wherein said edge sampler means comprises:
   a) a first AND gate including,
      a1) a first input for inputting said half-frequency present signal,
      a2) a second input for inputting said induced full-frequency signal and said half-frequency signal, whichever is present at said first AND gate second input,
      a3) an output for outputting a signal;
   b) an inverter with an input for inputting said induced full-frequency signal and said half-frequency signal, whichever is present at said inverter input, and an output for outputting an inverted version of said inputted signals;
   c) a second AND gate including,
      c1) a first input for inputting said half-frequency present signal,
      c2) a second input connected to said inverter output for inputting said inverted version of said induced full-frequency signal and said half-frequency signal, whichever is present at said second AND gate second input,
      c3) an output for outputting a signal;
   d) a first flip-flop including,
      d1) a "D" input for inputting said second reference signal,
      d2) an edge trigger input connected to said first AND gate output for inputting said first AND gate output signal,
      d3) a "Q" output for outputting a low level signal whenever said second reference signal is low and said edge trigger input is high, and a high level signal whenever said second reference signal is high and said edge trigger input is high; and,
   e) a second flip-flop including,
      e1) a "D"l0 input for inputting said second reference signal,
      e2) an edge trigger input connected to said second AND gate output for inputting said second AND gate output signal,
      e3) a "Q" output for outputting a low level signal whenever said second reference signal is low and said edge trigger input is high, and a high level signal whenever said second reference signal is high and said edge trigger input is high.

11. The cordless digitizer of claim 3, wherein said half-frequency phase state indicator means comprises:
   a) a first exclusive-OR gate including,
      a1) a first input connected to said reference signal generator means output for inputting said first reference signal,
      a2) a second input connected to said pointing device signal phase indicator means output for inputting said pointing device phase state signal,
      a3) an output providing an output signal;
   b) a divide-by-two counter with an input connected to said first exclusive-OR gate output for providing at an output a signal having half the frequency as said first exclusive-OR gate output signal and wherein the rising edges of said half-frequency signal correspond to the rising edges of said first exclusive-OR gate output signal
   c) a second exclusive-OR gate including,
      c1) a first input connected to said divide-by-two counter output for inputting said half-frequency signal,
      c2) a second input for inputting said induced full-frequency signal and said induced half-frequency signal, whichever is present at said second exclusive-OR gate input,
      c3) an output providing an output signal;
   d) a signal integrator means having an input connected to said second exclusive-OR gate output for providing an integrated signal at an output wherein said integrated signal is produced from said output signal from said second exclusive-OR gate; and,
   e) a decision thresholder means having an input connected to said signal integrator means output for providing said half-frequency phase state signal at an output whenever said integrated signal exceeds a predetermined threshold level.

12. The cordless digitizer of claim 1, wherein said pointing device comprises:
   a) a basic pointing device signal generator for generating upon activation a basic pointing device signal having a first frequency for a predetermined period of time;
   b) a user activated button having a binary code associated therewith, wherein said code has a sequence of binary bits each bit being one of (i) a first binary state, and (ii) a second binary state;
   c) a control logic means connected to said basic pointing device signal generator and said button for outputting whenever said button is activated a continuous signal having periods of signal at said first frequency and separate periods of signal having a second frequency which is lower than the first frequency wherein the signal at said second frequency has one of a first and second phase state differing by 180 degrees, and for encoding the continuous signal with said button code by making each period of signal at the second frequency sequentially correspond to the binary bits of said button code wherein the first phase corresponds to said first binary state and said second phase corresponds to said second binary state; and,
   d) a driver connected to said control logic for driving a coil such that said first and second alternating current (AC) magnetic field signals are transmitted from a pointing device tip, and wherein the first AC magnetic field signal has the same frequency and phase state as the periods of signal output from the control logic means at said first frequency and the second AC magnetic field signal has the same frequency and phase state as the periods of signal output from the control logic means at said second frequency.

13. The cordless digitizer of claim 12, wherein said pointing device further comprises:
   at least one additional user activated button, wherein each additional button has a unique binary code associated therewith and is connected to said control logic means.

14. The cordless digitizer of claim 13, wherein said control logic means comprises:

a) a binary sequence logic generator for outputting a signal representing the unique binary code associated with an activated pointing device button and for outputting an activating signal which activates the basic pointing device signal generator;

b) a buffer connected to the binary sequence logic generator for storing said binary code and outputting, whenever a control signal is received, a signal representing the first binary state if the next sequential binary bit making up the code corresponds to the first binary state and the second binary state if the next sequential binary bit making up the code corresponds to the second binary state;

c) a frequency divider for outputting a signal having a predetermined frequency which is lower than an inputted signal;

d) a switch connected to the basic pointing device frequency generator for routing the basic pointing device signal to the driver whenever a control signal is not received and routing the basic pointing device signal to the frequency divider for a duration of a period in which a control signal is received;

e) a burst controller connected to the buffer and the switch for outputting a control signal having a duration equal to a predetermined number of cycles of the basic pointing device signal and at a predetermined duty cycle;

f) a selective phase inverter connected to the frequency divider for changing the phase of the signal output from the frequency divider by 180 degrees whenever the selective phase inverter is enabled, said selective phase inverter being enabled whenever a signal representing the first binary state is received at an enabling input; and, g) a selective delay device connected to the buffer for outputting a delayed version of the signal output from the buffer whenever that signal represents the first binary state and for outputting an undelayed version of the signal from the buffer whenever that signal represents the second binary state, said signal output from the selective delay device being input to the enabling input of the selective phase inverter.

15. A method of indicating the phase of a first alternating current (AC) magnetic field signal transmitting from a pointing device of a cordless digitizer and determining if the phase of a second AC magnetic field signal transmitting from said pointing device, which has a lower frequency than said pointing device first signal, is approximately the same or approximately inverted in phase from a lower frequency reference signal, from a full-frequency signal and a lower-frequency signal induced in a tablet sensing conductor of said cordless digitizer, wherein said induced full-frequency signal is induced by said pointing device first signal and said induced lower-frequency signal is induced by a pointing device second signal, the method comprising the steps of:

a) generating reference signals having about the same frequency as said induced full-frequency signal wherein a first reference signal is approximately in phase with said induced full-frequency signal and a second reference signal has a phase about 90 degrees skewed from said induced full-frequency signal, said reference signals being provided in response to inputs of said induced full-frequency signal whenever said pointing device is transmitting said pointing device first signal and said induced lower-frequency signal whenever said pointing device is transmitting said pointing device second signal;

b) providing a lower-frequency present signal indicating said pointing device is transmitting said pointing device second signal, said lower-frequency present signal being provided in response to inputs of a signal induced by said pointing device in said conductor and said first reference signal;

c) providing a pointing device phase state signal indicating whether said induced full-frequency signal is closer to being one of (i)in phase with, and (ii) 180 degrees out of phase with said pointing device first signal, said pointing device phase state signal being provided in response to inputs of said induced lower-frequency signal and said second reference signal; and, d) providing a lower-frequency phase state signal indicating whether said induced second signal has one of (i) a phase substantially the same as, and (ii) a phase about 180 degrees different from said lower-frequency reference signal, said lower-frequency phase state signal being provided in response to inputs of said lower-frequency reference signal which is formed by comparing said first reference signal and said pointing device phase state signal, and said induced lower-frequency signal.

16. The method of claim 15, wherein said step of generating said first and second reference signals comprises:

a) providing said first and second reference signals using a first phase-lock loop (PLL) means whenever said induced full-frequency signal is present at said reference signal generating means input by enabling said first PLL means only whenever said induced full-frequency signal is present at said reference signal generating means input; and, b) providing said first and second reference signals using a second phase-lock loop (PLL) means whenever said induced lower-frequency signal is present at said reference signal generating means input by enabling said second PLL only whenever said induced lower-frequency signal is present at said reference signal generating means input.

17. A device for use in a cordless digitizer having a pointing device capable of separately transmitting first and second alternating current (AC) magnetic field signals, said pointing device second signal having a lower frequency than said pointing device first signal and a tablet with sensing conductors, the device comprising:

a) a means for indicating the phase of said pointing device first signal, from a full-frequency signal and a lower-frequency signal induced in a sensing conductor, wherein said induced full-frequency signal is induced by said pointing device first signal and said induced lower-frequency signal is induced by said pointing device second signal; and b) a means for determining if the phase of said lower-frequency signal induced in said sensing conductor by said pointing device is approximately the same or approximately inverted in comparison to a lower-frequency reference signal, said lower-frequency reference signal being generated by electronics disposed in the tablet and having essentially the same frequency as the lower-frequency signal induced in said sensing conductor.

18. The device of claim 17, wherein said pointing device second signal has one-half the frequency of the pointing device first signal, and wherein said pointing device first signal phase indicating means comprises:
   a) a reference signal generating means for providing reference signals having about the same frequency as said induced full-frequency signal wherein a first reference signal is approximately in phase with said induced full-frequency signal and a second reference signal has a phase about 90 degrees skewed from said induced full-frequency signal, said reference signals being provided in response to inputs of said induced full-frequency signal whenever said pointing device is transmitting said pointing device first signal and an induced half-frequency signal whenever said pointing device is transmitting said pointing device second signal;
   b) a half-frequency signal present indicating means for providing a half-frequency present signal indicating said pointing device is transmitting said pointing device second signal, said half-frequency present signal being provided in response to inputs of a signal induced by said pointing device in said conductor and said first reference signal; and,
   c) a pointing device signal phase indicator means for providing a pointing device phase state signal indicating whether said induced full-frequency signal is closer to being one of (i) in phase with, and (ii) 180 degrees out of phase with said pointing device first signal, said pointing device phase state signal being provided in response to inputs of said induced half-frequency signal and said second reference signal.

19. The device of claim 18, wherein said induced half-frequency signal phase determining means comprises:
   a) said reference signal generating means;
   b) said half-frequency signal present indicating means;
   c) said pointing device signal phase indicator means; and,
   d) a half-frequency phase state indicator means for providing a half-frequency phase state signal indicating whether said induced second signal has one of (i) a phase substantially the same as, and (ii) a phase about 180 degrees different from a half frequency reference signal, said half-frequency phase state signal being provided in response to inputs of said half-frequency reference signal which is formed by comparing said first reference signal and said pointing device phase state signal, and said induced half-frequency signal.

20. The device of claim 19, wherein said reference signal generating means comprises:
   a) a first phase-lock loop (PLL) means for providing said first and second reference signals whenever said induced full-frequency signal is present at an input of said reference signal generating means, said first PLL means including a means for enabling said first PLL means only when said induced full-frequency signal is present at said reference signal generating means input; and,
   b) a second phase-lock loop (PLL) means for providing said first and second reference signals whenever said induced half-frequency signal is present at said reference signal generating means input, said second PLL means including a means for enabling said second PLL only when said induced half-frequency signal is present at said reference signal generating means input.

* * * * *